United States Patent
Uss et al.

(10) Patent No.: US 11,475,587 B2
(45) Date of Patent: Oct. 18, 2022

(54) ELECTRONIC DEVICE FOR PROVIDING AUGMENTED-REALITY CONTENT AND OPERATION METHOD THEREOF

(71) Applicant: Samsung Electronics Co., Ltd., Suwon-si (KR)

(72) Inventors: Mykhailo Uss, Kyiv (UA); Andrii But, Kyiv (UA); Olena Horokh, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/412,593

(22) Filed: Aug. 26, 2021

(65) Prior Publication Data

US 2022/0067959 A1 Mar. 3, 2022

(30) Foreign Application Priority Data

Aug. 27, 2020 (KR) .................. 10-2020-0108782

(51) Int. Cl.
| | |
|---|---|
| *G06T 7/73* | (2017.01) |
| *G06T 7/60* | (2017.01) |
| *G06K 9/62* | (2022.01) |
| *G06T 19/00* | (2011.01) |
| *G06V 20/20* | (2022.01) |

(52) U.S. Cl.
CPC .............. *G06T 7/73* (2017.01); *G06K 9/6215* (2013.01); *G06T 7/60* (2013.01); *G06T 19/006* (2013.01); *G06V 20/20* (2022.01)

(58) Field of Classification Search
None
See application file for complete search history.

(56) References Cited

U.S. PATENT DOCUMENTS

| | | |
|---|---|---|
| 9,129,148 B1 | 9/2015 | Li et al. |
| 9,911,340 B2 | 3/2018 | Samarasekera et al. |
| 10,248,860 B2 | 4/2019 | Mai et al. |
| 10,262,464 B2 | 4/2019 | Anderson |
| 2012/0195460 A1* | 8/2012 | Lawrence Ashok Inigo ............... G06T 19/006 382/103 |

(Continued)

FOREIGN PATENT DOCUMENTS

WO 2020/101197 A1 5/2020

OTHER PUBLICATIONS

Tomono et al., Object-based Localization and Mapping using Loop Constraints and Geometric Prior Knowledge, Proceedings of the 2003 IEEE, International Conference on Robotics & Automation, Sep. 2003, Taipei, Taiwan.

(Continued)

*Primary Examiner* — Edward Martello
(74) *Attorney, Agent, or Firm* — Jefferson IP Law, LLP

(57) ABSTRACT

An electronic device is provided. The electronic device includes a camera and a processor, wherein the processor is configured to obtain a first screen including a plurality of objects through the camera, identify s size of each of the plurality of objects, based on a geometric shape of each of the plurality of objects, identify a relative position of each of the plurality of objects, based on distances between the plurality of objects, obtain a first descriptor of the first screen, based on the size and the relative position of each of the plurality of objects, and display augmented-reality content in a space of the first screen, using the first descriptor.

22 Claims, 17 Drawing Sheets

(56) References Cited

U.S. PATENT DOCUMENTS

| | | |
|---|---|---|
| 2013/0120224 A1 | 5/2013 | Cajigas et al. |
| 2016/0162177 A1 | 6/2016 | Kim |
| 2018/0336729 A1 | 11/2018 | Prideaux-Ghee et al. |
| 2020/0098123 A1 | 3/2020 | Anadure et al. |

OTHER PUBLICATIONS

Bowman et al., Probabilistic Data Association for Semantic SLAM, 2017 IEEE International Conference on Robotics and Automation (ICRA), Jun. 3, 2017, Singapore.

International Search Report dated Dec. 1, 2021, issued in International Application No. PCT/KR2021/011499.

* cited by examiner

DESCRIPTOR = (OBJECT LABEL, OBJECT SIZE, RELATIVE POSITION BETWEEN OBJECTS)
                        510              520                    530

DESCRIPTOR = (OBJECT 1, OBJECT 2, OBJECT 3, SIZE 1, SIZE 2, SIZE 3,
                          510                          520
              DISTANCE 1, DISTANCE 2, DISTANCE 3)
                          530

ELECTRONIC DEVICE FOR PROVIDING AUGMENTED-REALITY CONTENT AND OPERATION METHOD THEREOF

CROSS-REFERENCE TO RELATED APPLICATION(S)

This application is based on and claims priority under 35 U.S.C. § 119(a) of a Korean patent application number 10-2020-0108782, filed on Aug. 27, 2020, in the Korean Intellectual Property Office, the disclosure of which is incorporated by reference herein in its entirety.

BACKGROUND

1. Field

The disclosure relates to an electronic device for providing augmented-reality content and an operation method thereof.

2. Description of the Related Art

Augmented reality (AR) is technology for overlapping a three-dimensional (or two-dimensional) virtual image with a real image or background and displaying the overlapping images as a single image. Technology for augmented reality in which a real environment and a virtual object are mixed may enable a user to see the real environment to provide a higher level of realism and additional information.

An electronic device based on augmented reality may display artificial content on a screen captured through a camera. In addition, a wearable device based on augmented reality may input an image provided through a projector, into an input grating surface through a prism. Thereafter, a user can see an image passing through an output grating surface with his/her eyes. The user can observe the image together with a real environment so as to, for example, identify information of an object in an environment currently being observed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for operating thereof, the electronic device displaying augmented-reality content which is identifiable even from different viewpoints by using a descriptor of a screen, obtained based on geometric characteristics of multiple objects in the screen.

Additional aspects will be set forth in part in the description which follows and, in part, will be apparent from the description, or may be learned by practice of the presented embodiments.

In accordance with an aspect of the disclosure, an electronic device is provided. The electronic device includes a camera and a processor, wherein the processor is configured to obtain a first screen including a plurality of objects through the camera, identify s size of each of the plurality of objects, based on a geometric shape of each of the plurality of objects, identify a relative position of each of the plurality of objects, based on distances between the plurality of objects, obtain a first descriptor of the first screen, based on the size and the relative position of each of the plurality of objects, and display augmented-reality content in a space of the first screen, using the first descriptor.

In accordance with another aspect of the disclosure, an method for operating of an electronic device is provided. The method includes obtaining a first screen including a plurality of objects through a camera included in the electronic device, identifying a size of each of the plurality of objects, based on a geometric shape of each of the plurality of objects, identifying a relative position of each of the plurality of objects, based on distances between the plurality of objects, obtaining a first descriptor of the first screen, based on the size and the relative position of each of the plurality of objects, and displaying augmented-reality content in a space of the first screen, using the first descriptor.

In accordance with another aspect of the disclosure, a non-transitory computer-readable recording medium is provided. The recording medium store a program for performing operations of obtaining a first screen including a plurality of objects through a camera included in an electronic device, identifying a size of each of the plurality of objects, based on a geometric shape of each of the plurality of objects, identifying a relative position of each of the plurality of objects, based on distances between the plurality of objects, obtaining a first descriptor of the first screen, based on the size and the relative position of each of the plurality of objects, and displaying augmented-reality content in a space of the first screen, using the first descriptor.

An electronic device according to various embodiments can identify augmented-reality content even from different viewpoints by using a descriptor of a screen, obtained based on geographic characteristics of a plurality of objects in the screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the disclosure will be more apparent from the following detailed description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
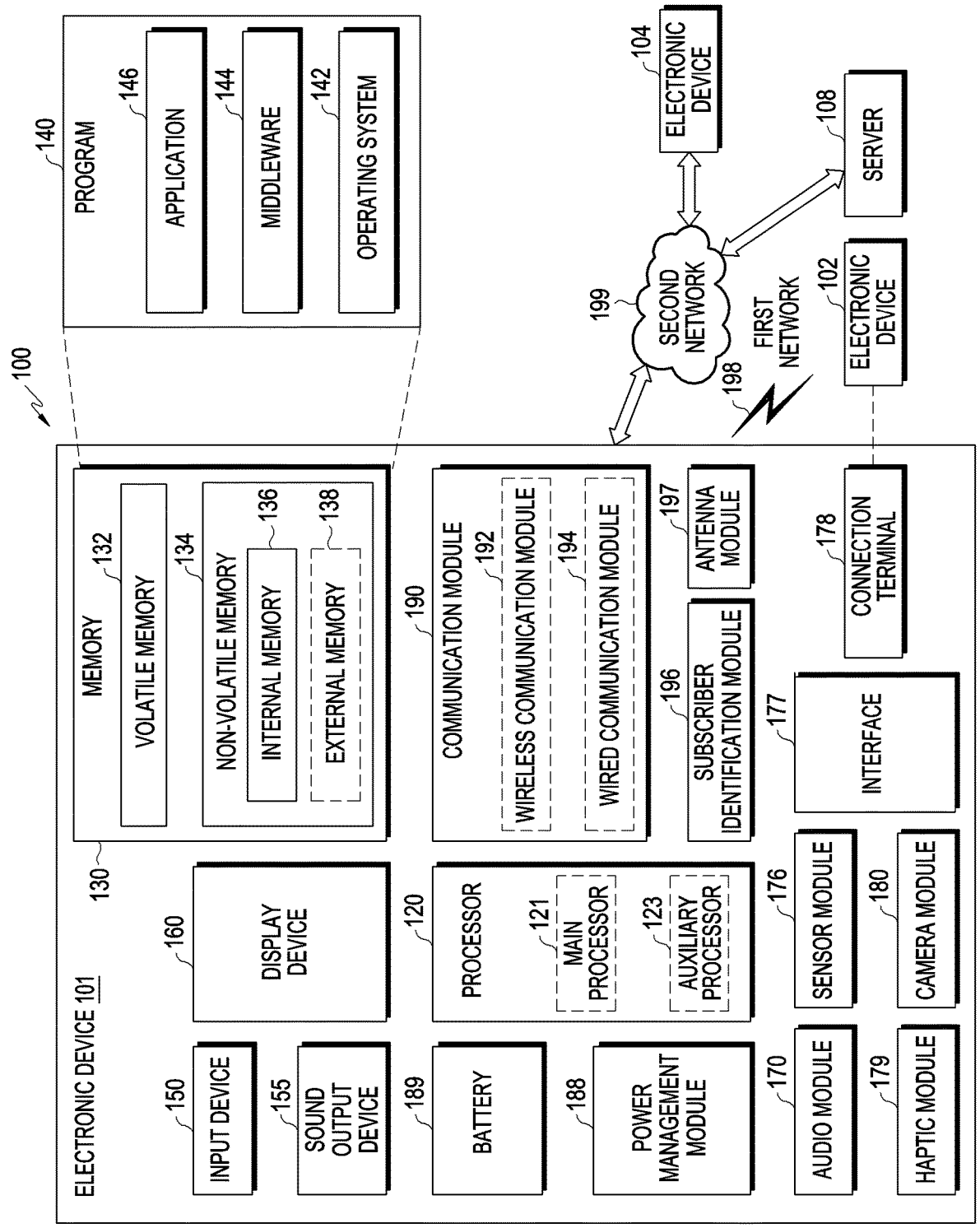
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, in the network environment 100, the electronic device 101 may communicate with an external electronic device 102 through a first network 198 (e.g., a short-range wireless communication network), or may communicate with an electronic device 104 or a server 108 through a second network 199 (e.g., a long-range wireless communication network). According to an embodiment of the disclosure, the electronic device 101 may communicate with the electronic device 104 through the server 108. According to an embodiment of the disclosure, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In an embodiment of the disclosure, at least one (e.g., the connection terminal 178) of the elements described above may be omitted from the electronic device 101, or at least one other element may be added thereto. In an embodiment of the disclosure, some (e.g., the sensor module 176, the camera module 180, or the antenna module 197) of the elements may be integrated into a single element (e.g., the display module 160).

The processor 120 may, for example, execute software (e.g., a program 140) to control at least one other element (e.g., a hardware or software element) of the electronic device 101 connected to the processor 120, and perform various data-processing operations or calculations. According to an embodiment of the disclosure, as at least a part of the data-processing operations or calculations, the processor 120 may store, in a volatile memory 132, a command or data received from another element (e.g., the sensor module 176 or the communication module 190), process the command or data stored in the volatile memory 132, and store the resultant data in a nonvolatile memory 134. According to an embodiment of the disclosure, the processor 120 may include a main processor 121 (e.g., a central processing device, or an application processor), or an auxiliary processor 123 (e.g., a graphics processing device, a neural processing unit (NPU), an image signal processor, a sensor hub processor, or a communication processor), which can be operated independently from or together with the main processor. For example, if the electronic device 101 includes the main processor 121 and the auxiliary processor 123, the auxiliary processor 123 may be configured to use less power than that used by the main processor 121, or to be specialized for a designated function. The auxiliary processor 123 may be implemented as a part of the main processor 121 or separately therefrom.

The auxiliary processor 123 may, for example, control at least a part of functions or states related to at least one element (e.g., the display module 160, the sensor module 176, or the communication module 190) among the elements of the electronic device 101 on behalf of the main processor 121 while the main processor 121 is in an inactive (e.g., sleep) state, or together with the main processor 121 while the main processor 121 is in an active (e.g., application execution) state. According to an embodiment of the disclosure, the auxiliary processor 123 (e.g., an image signal processor or a communication processor) may be implemented as a part of another element (e.g., the camera module 180 or the communication module 190) that is functionally related to the auxiliary processor. According to an embodiment of the disclosure, the auxiliary processor 123 (e.g., a neural processing unit) may include a hardware structure specialized in processing an artificial-intelligence model. The artificial-intelligence model may be generated through machine learning. For example, such learning may be autonomously performed in the electronic device 101 in which an artificial intelligence is operated, or may be performed through a separate server (e.g., the server 108). A learning algorithm may include, for example, supervised learning, unsupervised learning, semi-supervised learning, or reinforcement learning. However, the learning algorithm is not limited to the above example. The artificial-intelligence model may include a plurality of artificial-neural-network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above networks. However, the artificial neural network is not limited thereto. The artificial-intelligence model may include a software structure in addition to a hardware structure or as an alternative thereto.

The memory 130 may store various data used by at least one element (e.g., the processor 120 of the sensor module 176) of the electronic device 101. The data may include, for example, software (e.g., the program 140), and input data or output data of a command related thereto. The memory 130 may include the volatile memory 132 or the nonvolatile memory 134. The nonvolatile memory 134 may include an internal memory 136 and an external memory 136.

The program 140 may be stored in the memory 130 as software, and, for example, may include an operating system 142, middleware 144, or an application 146.

The input module 150 may receive a command or data to be used for an element (e.g., the processor 120) of the electronic device 101 from the outside of the electronic device 101 (e.g., from a user). The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playback of multimedia or a recording. The receiver may be used to receive an incoming call. According to an embodiment of the disclosure, the receiver may be implemented separately from the speaker or as a part thereof.

The display module 160 may visually provide information to the outside of the electronic device 101 (e.g., to a user). The display module 160 may include, for example, a display, a hologram device, or a projector, as well as a control circuit for controlling a corresponding device. According to an embodiment of the disclosure, the display module 160 may include a touch sensor configured to detect a touch, or a pressure sensor configured to measure the level of force generated by the touch.

The audio module 170 may convert sound into an electrical signal, or conversely may convert an electrical signal into sound. According to an embodiment of the disclosure, the audio module 170 may obtain sound through the input module 150, or may output sound through the sound output module 155 or an external electronic device (e.g., the external electronic device 102)(e.g., a speaker or a headphone) that is directly or wirelessly connected to the electronic device 101.

The sensor module 176 may detect an operation state (e.g., power or temperature) of the electronic device 101 or an external environment state (e.g., a user's state), and generate an electrical signal or a data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols which are usable for the electronic device 101 to be directly or wirelessly connected to an external electronic device (e.g., the external electronic device 102). According to an embodiment of the disclosure, the interface 177 may include, for example, a high-definition multimedia interface (HDMI), a universal serial bus (USB) interface, an SD card interface, or an audio interface.

The connection terminal 178 may include a connector through which the electronic device 101 can be physically connected to an external electronic device (e.g., the external electronic device 102). According to an embodiment of the disclosure, the connection terminal 178 may include, for example, an HDMI connector, a USB connector, an SD card connector, or an audio connector (e.g., a headphone connector).

The haptic module 179 may convert an electrical signal into an electrical stimulus or a mechanical stimulus (e.g., vibration or movement) that a user can recognize through his/her tactile or kinesthetic sense. According to an embodiment of the disclosure, the haptic module 179 may include, for example, a motor, a piezoelectric element, or an electrostimulator.

The camera module 180 may capture a still image or a moving image. According to an embodiment of the disclosure, the camera module 180 may include one or more lenses, image sensors, image signal processors, or flashes.

The power management module 188 may manage the power supplied to the electronic device 101. According to an embodiment of the disclosure, the power management module 188 may be implemented, for example, as at least a part of a power management integrated circuit (PMIC).

The battery 189 may supply power to at least one element of the electronic device 101. According to an embodiment of the disclosure, the battery 189 may include, for example, a non-rechargeable primary battery, a rechargeable secondary battery, or a fuel battery.

The communication module 190 may support establishment of a direct (e.g., wired) communication channel or a wireless communication channel between the electronic device 101 and an external electronic device (e.g., the external electronic device 102, the electronic device 104, or the server 108), and execution of communication through an established communication channel. The communication module 190 may be operated independently from the processor 120 (e.g., an application processor), and may include one or more communication processors supporting direct (e.g., wired) or wireless communication. According to an embodiment of the disclosure, the communication module 190 may include a wireless communication module 192 (e.g., a cellular communication module, a short-range wireless communication module, or a global navigation satellite system (GNSS) communication module), or a wired communication module 194 (e.g., a local area network (LAN) communication module or a power-line communication module). A corresponding communication module among the communication modules described above may communicate with the external electronic device 104 through the first network 198 (e.g., a short-range communication network, such as Bluetooth, wireless fidelity (Wi-Fi) direct, or infrared data association (IrDA)), or the second network 199 (e.g., a long-range communication network, such as a legacy cellular network, a $5^{th}$ generation (5G) network, a next-generation communication network, the Internet, or a computer network (e.g., a LAN or WAN). Various types of communication modules as described above may be integrated into one element (e.g., a single chip), or may be implemented as multiple separate elements (e.g., multiple chips). The wireless communication module 192 may identify or authenticate the electronic device 101 in a communication network, such as the first network 198 or the second network 199, by using subscriber information (e.g., an international mobile subscriber identifier (IMSI)) stored in the subscriber identification module 196.

The wireless communication module 192 may support a 5G network and next-generation communication technology beyond 4G networks, for example, a new radio (NR) access technology. The NR access technology may support high-speed transfer of a large amount of data (enhanced mobile broadband (eMBB)), terminal power minimization and access by multiple terminals (massive machine type communications (mMTC)), or high reliability and low latency (ultra-reliable and low-latency communications (URLLC)). The wireless communication module 192 may support, for example, a high frequency band (e.g., mmWave bands) in order to accomplish a high data transfer rate. The wireless communication module 192 may support various technologies for ensuring performance in high frequency bands, for example, beamforming, massive multiple-input and multiple-output (massive MIMO), full-dimensional MIMO (FD-MIMO), an array antenna, analog beamforming, or a large-scale antenna. The wireless communication module 192 may support various requirements regulated for the electronic device 101, an external electronic device (e.g., the electronic device 104), or a network system (e.g., the second network 199). According to an embodiment of the disclosure, the wireless communication module 192 may support a peak data rate (e.g., 20 Gbps or higher) for implementation of eMBB, a loss coverage (e.g., 164 dB or lower) for implementation of mMTC, or a U-plane latency (e.g., 0.5 ms or lower for each of downlink (DL) and uplink (UL), or 1 ms or lower for round trip) for implementation of URLLC.

The antenna module 197 may transmit a signal or power to the outside (e.g., an external electronic device), or may receive same from the outside. According to an embodiment of the disclosure, the antenna module 197 may include an antenna including a radiator configured by a conductive pattern or a conductor formed on a substrate (e.g., a PCB). According to an embodiment of the disclosure, the antenna module 197 may include multiple antennas (e.g., an array antenna). At least one antenna suitable for a communication scheme used in a communication network, such as the first network 198 or the second network 199, may be selected, for example, from among the multiple antennas by the communication module 190. A signal or power may be transmitted or received between the communication module 190 and an external electronic device through the selected at least one antenna. According to an embodiment of the disclosure, another component (e.g., a radio-frequency integrated circuit (RFIC)) other than the radiator may be additionally provided as a part of the antenna module 197.

According to various embodiments of the disclosure, the antenna module 197 may configure a mmWave antenna module. According to an embodiment of the disclosure, the mmWave antenna module may include a printed circuit board, an RFIC disposed on a first surface (e.g., the under surface) of the printed circuit board or disposed adjacent thereto so as to support a designated high frequency band (e.g., an mmWave band), and a plurality of antennas (e.g., an array antenna) disposed on a second surface (e.g., the top surface or side surface) of the printed circuit board or disposed adjacent thereto so as to transmit or receive a signal in the designated high frequency band.

At least some of the elements described above may be connected to each other through a communication scheme between surrounding devices (e.g., a bus, a general-purpose input/output (GPIO), a serial peripheral interface (SPI), or a mobile industry processor interface (MIPI)), and may exchange a signal (e.g., a command or data) with each other.

According to an embodiment of the disclosure, a command or data may be transmitted or received between an electronic device 101 and the external electronic device 104 through the server 108 connected to the second network 199. Each of the external electronic devices 102 or 104 may be a device that is of a type identical to or different from that of the electronic device 101. According to an embodiment of the disclosure, all or some of operations executed in the electronic device 101 may be executed in one or more external electronic devices among the external electronic devices 102, 104, or 108. For example, in the case where the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may or may not additionally process the result, and may provide the processed result as at least a part of a response for the request. To this end, for example, cloud-computing, distributed-computing, mobile-edge-computing (MEC), or client-server-computing technologies may be used. The electronic device 101 may provide, for example, ultra-low-latency service by using distributed computing or mobile edge computing. In another embodiment of the disclosure, the external electronic device 104 may include an Internet of Things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, smart city, smart car or health care), based on 5G communication technology and IoT-related technology.

Figure 2:
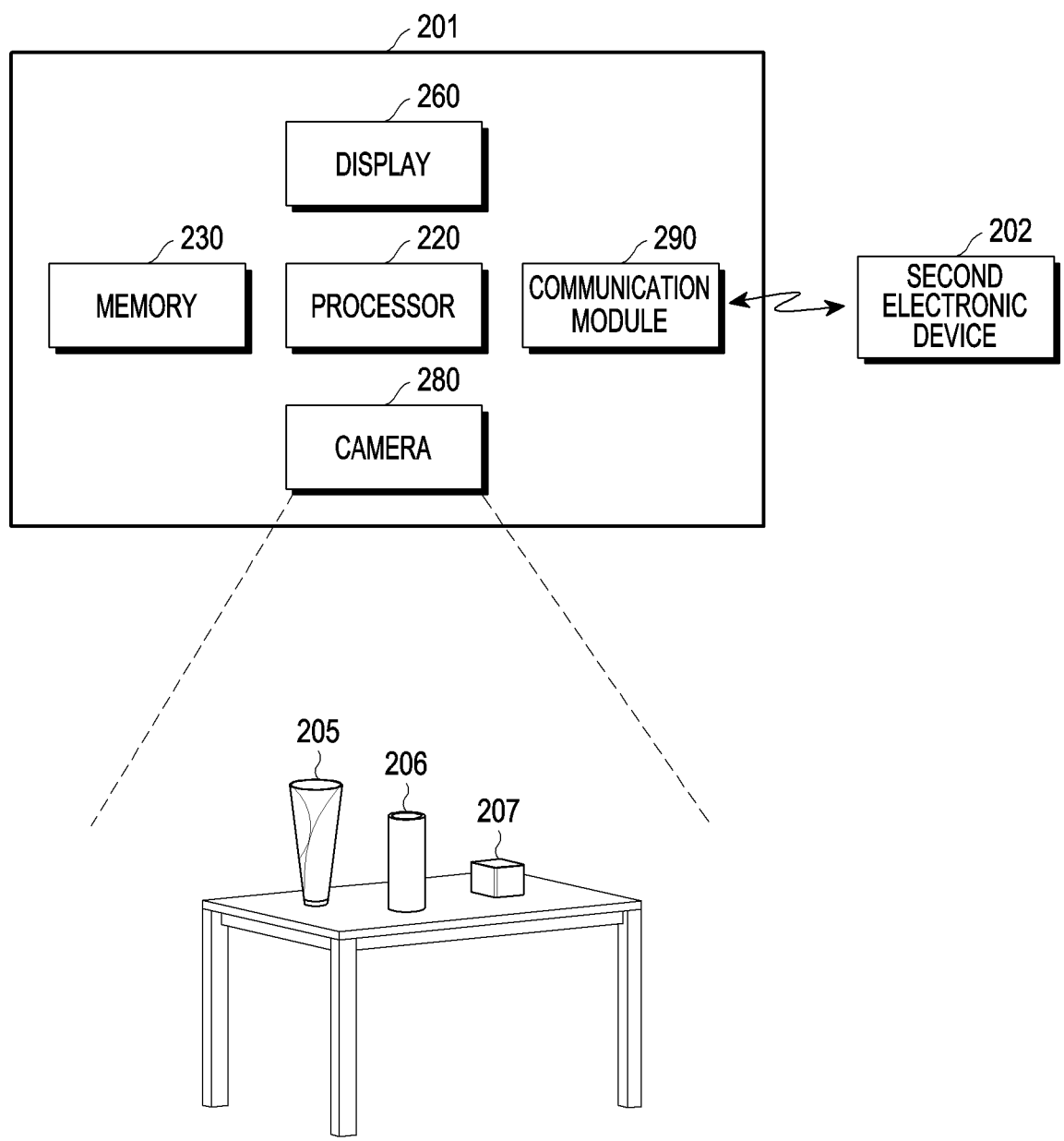
FIG. 2 is a block diagram briefly illustrating a first electronic device according to an embodiment of the disclosure.

FIG. 2 is a block diagram briefly illustrating a first electronic device according to an embodiment of the disclosure.

Referring to FIG. 2, an electronic system may include a first electronic device 201 and a second electronic device 202. For example, the first electronic device 201 may be implemented to be substantially identical or similar to the electronic device 101 in FIG. 1. In addition, the second electronic device 202 may be implemented to be substantially identical or similar to the external electronic device 102, 104, or 108 in FIG. 2.

According to various embodiments of the disclosure, the first electronic device 201 may include a processor 220, a memory 230, a display 260, a camera 280, and a communication module 290.

According to various embodiments of the disclosure, the processor 220 may control the overall operation of the first electronic device 201. For example, the processor 220 may be implemented to be substantially identical or similar to the processor 120 in FIG. 1.

According to various embodiments of the disclosure, the processor 220 may obtain a first screen including a plurality of objects (e.g., objects indicated by reference numerals 205, 206, and 207) through the camera 280 (e.g., the camera module 180 in FIG. 1). The processor 220 may display the first screen on the display 260 (e.g., the display device 260 in FIG. 1). For example, the first screen may be a screen obtained (or captured) from a first viewpoint through the camera 280. Each of the plurality of objects may be an object (or a thing) that has any of various shapes (e.g., a form, a figuration, and/or a color) and is included in the first screen.

According to various embodiments of the disclosure, the processor 220 may detect each of the plurality of objects. For example, the processor 220 may detect the first object 205, the second object 206, and the third object 207 included in the first screen. For example, the processor 220 may detect objects by using an object detection algorithm. The object detection algorithm may be a common object detection algorithm.

According to various embodiments of the disclosure, the processor 220 may perform a 3D modeling operation for detected objects. For example, the processor 220 may reconfigure detected objects in a 3D-modeled form. For example, the processor 220 may reconfigure the first object 205, the second object 206, and the third object 207 in a 3D-modeled form.

According to various embodiments of the disclosure, the processor 220 may identify the respective types of the plurality of objects (e.g., the plurality of objects which have been reconfigured in a 3D modeled form), based on designated geometric shapes. In addition, the processor 220 may identify the geometric shapes of the plurality of objects (e.g., the plurality of objects which have been reconfigured in a 3D modeled form), based on the designated geometric shapes. For example, the processor 220 may compare the designated geometric shapes with the respective shapes of the plurality of objects to identify the respective shapes of the plurality of objects. For example, the designated geometric shapes may include the shape of a general three-dimensional figure (e.g., a cuboid, a cube, a cylinder, a sphere, a truncated cone, and a 3D rectangle) and a combination thereof. The designated geometric shapes may include geometric shapes (e.g., a car shape, a chair shape, and a table shape) commonly characterizing particular things. The designated geometric shapes may be determined manually through selection by a user or automatically by the processor 220 in advance. For example, the processor 220 may store information on the designated geometric shapes in the memory 230 (e.g., the memory 130 in FIG. 1).

According to various embodiments of the disclosure, the processor 220 may identify the respective sizes (e.g., information for determining volume) of the plurality of objects, based on the geometric shapes of the plurality of objects. For example, the size of a rectangular object may be determined based on the width, the length, and the height of the object.

According to various embodiments of the disclosure, the processor 220 may identify the relative positions of the plurality of objects, based on the respective distances between the plurality of objects. For example, the relative positions may be determined by the distances between the center points of the objects.

According to various embodiments of the disclosure, the processor 220 may obtain a first descriptor of the first screen, based on the relative positions and sizes of the plurality of objects. For example, the first descriptor may include information on the plurality of objects included in the first screen. The first descriptor may be used to identify the first screen by means of the first electronic device 201.

According to various embodiments of the disclosure, the processor 220 may obtain the first descriptor by further considering at least one of orientations, gravitational directions, visual characteristics (e.g., a color and/or a material), or contact surfaces (e.g., the shape and/or size of a contact surface (e.g., a main contact surface) of an object contacting another object) of the plurality of objects. To this end, the processor 220 may obtain information on at least one of orientations, gravitational directions, visual characteristics, or contact surfaces of the plurality of objects.

According to various embodiments of the disclosure, the processor 220 may display, through the display 260, augmented-reality (AR) content in the space of the first screen, identified using the first descriptor. For example, the processor 220 may configure a coordinate system for the first screen by using the first descriptor. For example, the processor 220 may configure a coordinate value corresponding to the respective positions of the plurality of objects included in the first screen by using the first descriptor. The processor 220 may locate augmented-reality content to be associated with the plurality of objects included in the first screen, based on the coordinate system configured using the first descriptor. For example, the augmented-reality content may include an object artificially added to the first screen. The augmented-reality content may be stored in the memory 230. The augmented-reality content may be also obtained from an external electronic device through the communication module 290.

According to various embodiments of the disclosure, the processor 220 may transmit information on the first descriptor and the augmented-reality content to an external electronic device by using the communication module 290 (e.g., the communication module 190 in FIG. 1).

According to various embodiments of the disclosure, the processor 220 may obtain a second screen from a second viewpoint different from the first viewpoint, with respect to the plurality of objects included in the first screen. The processor 220 may change the direction of the camera 280 from the existing first viewpoint to the second viewpoint, to obtain a second descriptor of the second screen. According to another embodiment of the disclosure, the processor 220 may also obtain the second descriptor of the second screen obtained from the second viewpoint from the second electronic device 202. The second electronic device 202 may obtain the second screen from the second viewpoint and obtain the second descriptor of the second screen, based on the plurality of objects (e.g., the objects 205, 206, and 207) included in the second screen. The second electronic device 202 may transmit the second descriptor to the first electronic device 201.

According to various embodiments of the disclosure, the processor 220 may compare the first descriptor with the second descriptor to determine whether the first screen and the second screen match each other. For example, the fact that the first screen and the second screen match each other may imply that the first screen and the second screen have been obtained from different viewpoints with respect to the same scene (or the same state).

According to various embodiments of the disclosure, the processor 220 may search for at least one descriptor that matches the first descriptor. The processor 220 may obtain the at least one descriptor matching the first descriptor from an external electronic device according to a result of the search.

According to various embodiments of the disclosure, the processor 220 may compare a difference value between the first descriptor and the second descriptor with a pre-configured threshold value, and may determine whether the first screen and the second screen match each other, based on a result of the comparison. For example, if the difference value is not greater than the threshold value, the processor 220 may determine that the first screen and the second screen are screens showing an identical scene. For example, "identical scene" may indicate a scene obtained by capturing a plurality of objects in an identical state from different viewpoints. If the difference value is greater than the threshold value, the processor 220 may determine that the first screen and the second screen are screens showing different scenes. For example, "different scene" may indicate a scene obtained by capturing a plurality of objects that are not the same as the existing objects, or a scene obtained by capturing the objects identical to the existing objects in a state (e.g., a changed arrangement) different from an existing state.

According to various embodiments of the disclosure, the processor 220 may perform a designated function depending on whether the first screen and the second screen match each other. For example, if the first screen and the second screen do not match each other, the processor 220 may display augmented-reality content on the first screen without considering the second descriptor. If the first screen and the second screen do not match each other, the processor 220 may also display augmented-reality content on the first screen or the second screen, based on the difference value between the first descriptor and the second descriptor. If the first screen and the second screen match each other, the processor 220 may display augmented-reality content on the first screen or the second screen by considering both the first descriptor and the second descriptor.

According to various embodiments of the disclosure, the second electronic device 202 may be implemented to be identical or similar to the first electronic device 201. The second electronic device 202 may perform operations of the first electronic device 201 described above.

Hereinafter, at least some operations performed by the first electronic device 201 below may be performed by the processor 220. At least some operations performed by the second electronic device 202 below may be performed by a processor included in the second electronic device 202. For convenience of explanation, operations described below will be described as being performed by the first electronic device 201 or the second electronic device 202.

Figure 3:
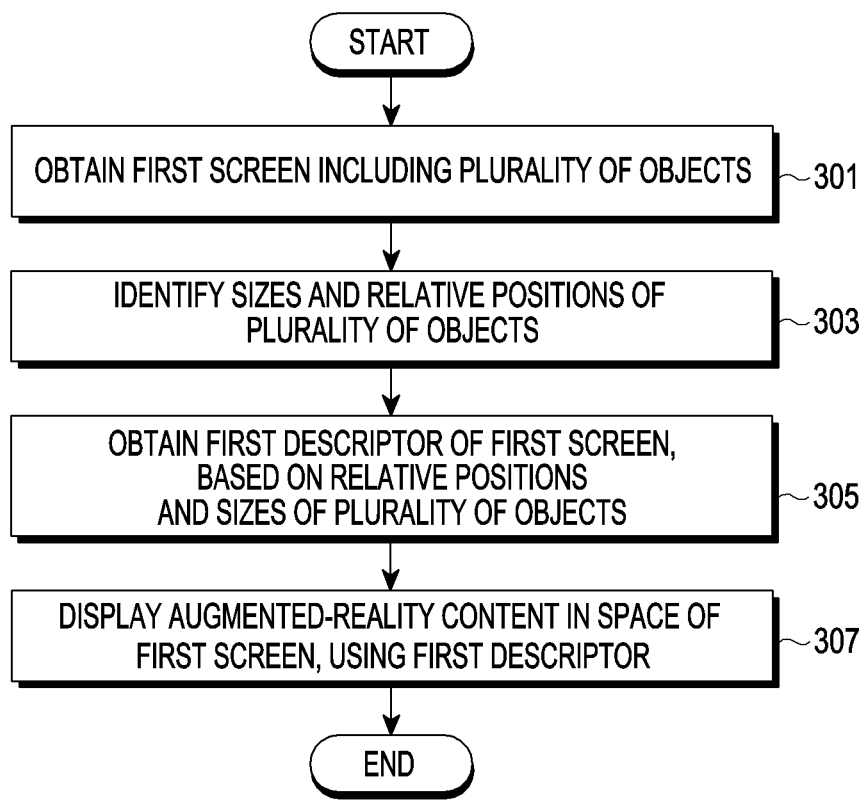
FIG. 3 is a flowchart illustrating a method for operating a first electronic device according to an embodiment of the disclosure.

FIG. 3 is a flowchart illustrating a method for operating a first electronic device according to an embodiment of the disclosure.

Referring to FIG. 3, according to various embodiments of the disclosure, in operation 301, a first electronic device (e.g., the first electronic device 201 in FIG. 2) may obtain a first screen including a plurality of objects. The first electronic device 201 may identify the plurality of objects included in the first screen in order to display augmented-reality content on the first screen. For example, the first electronic device 201 may identify the geometric shapes of the plurality of objects, based on a predesignated geometric shape.

According to various embodiments of the disclosure, in operation 303, the first electronic device 201 may identify the sizes and the relative positions of the plurality of objects.

According to various embodiments of the disclosure, in operation 305, the first electronic device 201 may obtain a first descriptor of the first screen, based on the relative positions and sizes of the plurality of objects.

According to various embodiments of the disclosure, in operation 307, the first electronic device may display augmented-reality content in the space of the first screen, identified using the first descriptor.

Figure 4:
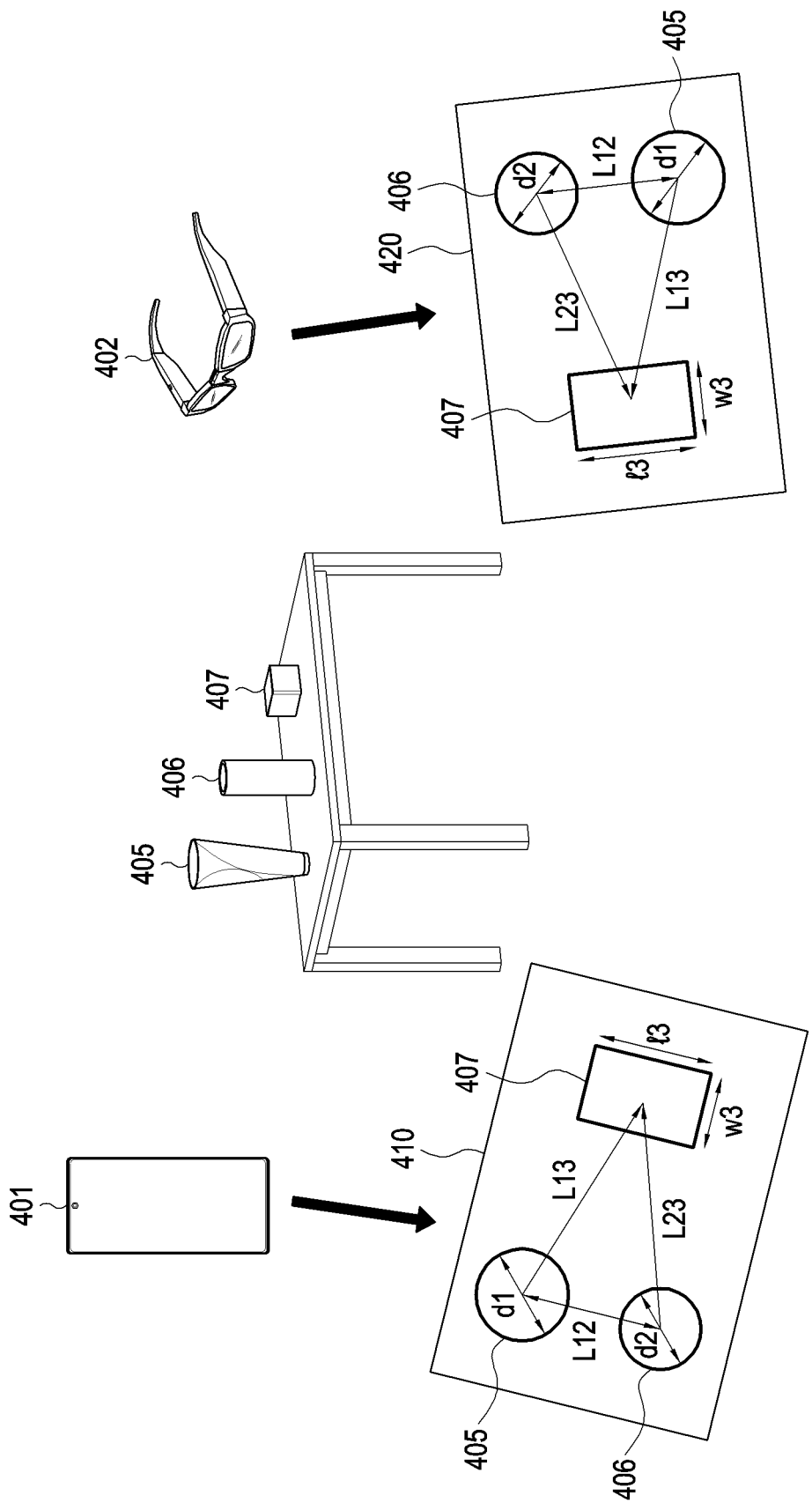
FIG. 4 is a diagram illustrating an operation of obtaining descriptors, based on a plurality of objects by a plurality of electronic devices according to an embodiment of the disclosure.

FIG. 4 is a diagram illustrating an operation of obtaining descriptors, based on a plurality of objects by a plurality of electronic devices according to an embodiment of the disclosure.

Referring to FIG. 4, according to various embodiments of the disclosure, a first electronic device 401 (e.g., the first electronic device 201 in FIG. 2) may obtain a first screen 410 including a first object 405, a second object 406, and a third object 407. A second electronic device 402 (e.g., the second electronic device 202 in FIG. 2) may obtain a second screen 420 including the first object 405, the second object 406, and the third object 407. For example, the first screen and the second screen may be screens obtained by capturing an identical scene from different viewpoints.

According to various embodiments of the disclosure, the first electronic device 401 may obtain a first descriptor of the first screen 410. For example, the first electronic device 401 may identify the size of the first object 405, based on the first diameter (d1) and the height of the first object 405, identify the size of the second object 406, based on the second diameter (d2) and the height of the second object 406, and identify the size of the third object 407, based on the width (w3), the length (l3), and the height of the third object 407. The first electronic device 401 may identify the first distance (L12) between the first object 405 and the second object 206, the second distance (L13) between the first object 405 and the third object 407, and the third distance (L23) between the second object 406 and the third object 407. The first electronic device 401 may obtain the first descriptor, based on the sizes and the relative positions (e.g., the distance between the objects) of the first object 405, the second object 406, and the third object 407.

According to various embodiments of the disclosure, the second electronic device 402 may obtain a second descriptor of the second screen 420. For example, the second electronic device 402 may identify the size of the first object 405, based on the first diameter (d1) and the height of the first object 405, identify the size of the second object 406, based on the second diameter (d2) and the height of the second object 406, and identify the size of the third object 407, based on the width (w3), the length (l3), and the height of the third object 407. The second electronic device 402 may identify the first distance (L12) between the first object 405 and the second object 206, the second distance (L13) between the first object 405 and the third object 407, and the third distance (L23) between the second object 406 and the third object 407. The second electronic device 402 may obtain the second descriptor, based on the sizes and the relative positions (e.g., the distance between the objects) of the first object 405, the second object 406, and the third object 407.

As described above, the first descriptor and the second descriptor may not depend on the position (or angle) of a viewpoint and the distances between the objects and the viewpoint. In the following description, with reference to FIGS. 5A, 5B, and 5C, an operation of obtaining (or generating) a first descriptor of a first screen by a first electronic device 201 or 401 will be described below.

Figures 5A, 5B, 5C:
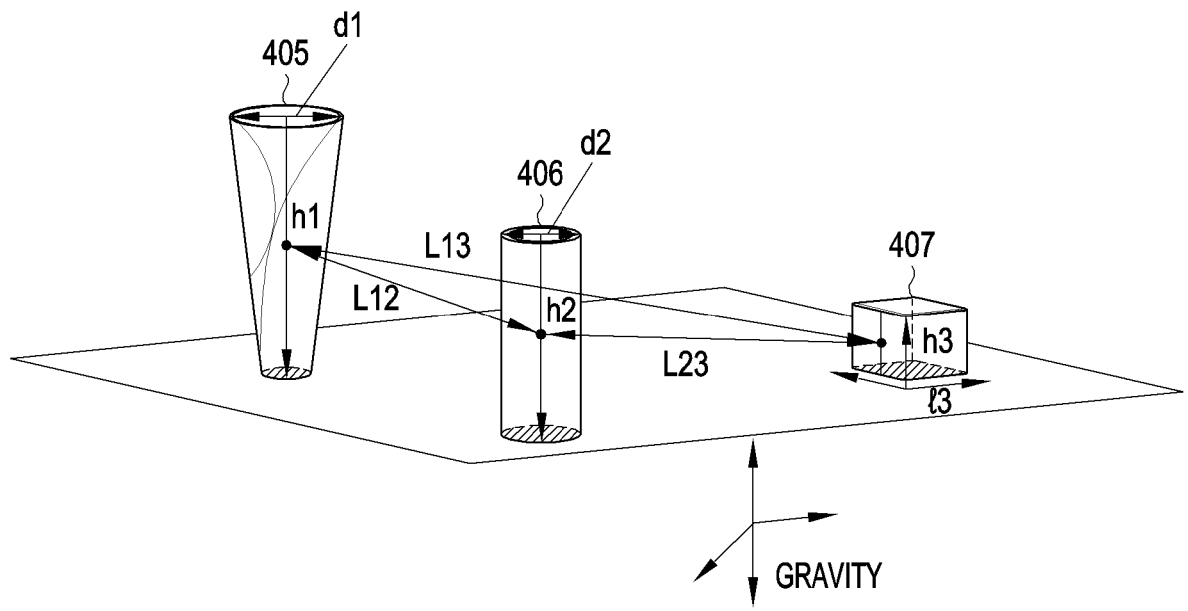
FIGS. 5A, 5B, and 5C are diagrams illustrating an operation of obtaining a first descriptor of a first screen, based on a plurality of objects by a first electronic device according to various embodiments of the disclosure.

FIGS. 5A, 5B, and 5C are diagrams illustrating an operation of obtaining a first descriptor of a first screen, based on a plurality of objects by a first electronic device according to various embodiments of the disclosure.

Referring to the view in FIG. 5A, according to various embodiments of the disclosure, the first electronic device 201 (e.g., the electronic device 201 in FIG. 2) may identify the geometric shape of the first object 405, the second object 406, and the third object 407, based on a designated geometric shape. For example, each of the first object 405 and the second object 406 may be cylindrical, and the third object 407 may be cuboidal.

According to various embodiments of the disclosure, the first electronic device 201 may identify the size of the first object 405, based on the first diameter (d1) and the height (h1) of the first object 405, identify the size of the second object 406, based on the second diameter (d2) and the height (h2) of the second object 406, and identify the size of the third object 407, based on the width (w3), the length (l3), and the height (h3) of the third object 407. The first electronic device 401 may identify the first distance (L12) between the first object 405 and the second object 206, the second distance (L13) between the first object 405 and the third object 407, and the third distance (L23) between the second object 406 and the third object 407.

Referring to the description in FIG. 5B, according to various embodiments of the disclosure, the first electronic device 201 may obtain (or generate) a first descriptor including information on an object label 510, an object size 520, and a relative position 530 between objects. For example, the object label 510 may include information on names, types, and/or identifiers (IDs) of the first object 405, the second object 406, and the third object 407. The object size 520 may include information on the sizes (e.g., diameter and height information, or width, length, and height information) of the first object 405, the second object 406, and the third object 407. The relative position 530 between objects may include information on the distances between the first object 405, the second object 406, and the third object 407. The first descriptor may further include information on at least one of orientations, visual characteristics (e.g., a color and/or a material), or contact surfaces (e.g., the shape and/or size of a contact surface) of the first object 405, the second object 406, and the third object 407.

Referring to the description in FIG. 5C, according to various embodiments of the disclosure, the object label 510 may include information on a name (e.g., a first cylindrical object) of the first object 405, a name (e.g., a second cylindrical object) of the second object 406, and a name (e.g., a cuboidal object) of the third object 407. The object size 520 may include information on a first size (d1 and h1), a second size (d2 and h2), and a third size (w3, l3, and h3). The relative position 530 between objects may include information on the first distance L12, the second distance L13, and the third distance L23.

According to various embodiments of the disclosure, the first electronic device 201 may obtain the first descriptor of the first screen, based on information on the plurality of objects (e.g., objects indicated by reference numerals 405, 406, and 407).

According to various embodiments of the disclosure, the second electronic device 202 or 402 may obtain a second descriptor of a second screen according to the same operation as that for obtaining the first descriptor of the first screen by the first electronic device 201 or 401 as described above. For convenience of explanation, the detailed method for obtaining the second descriptor by the second electronic device 202 or 402 will be omitted.

Figure 6:
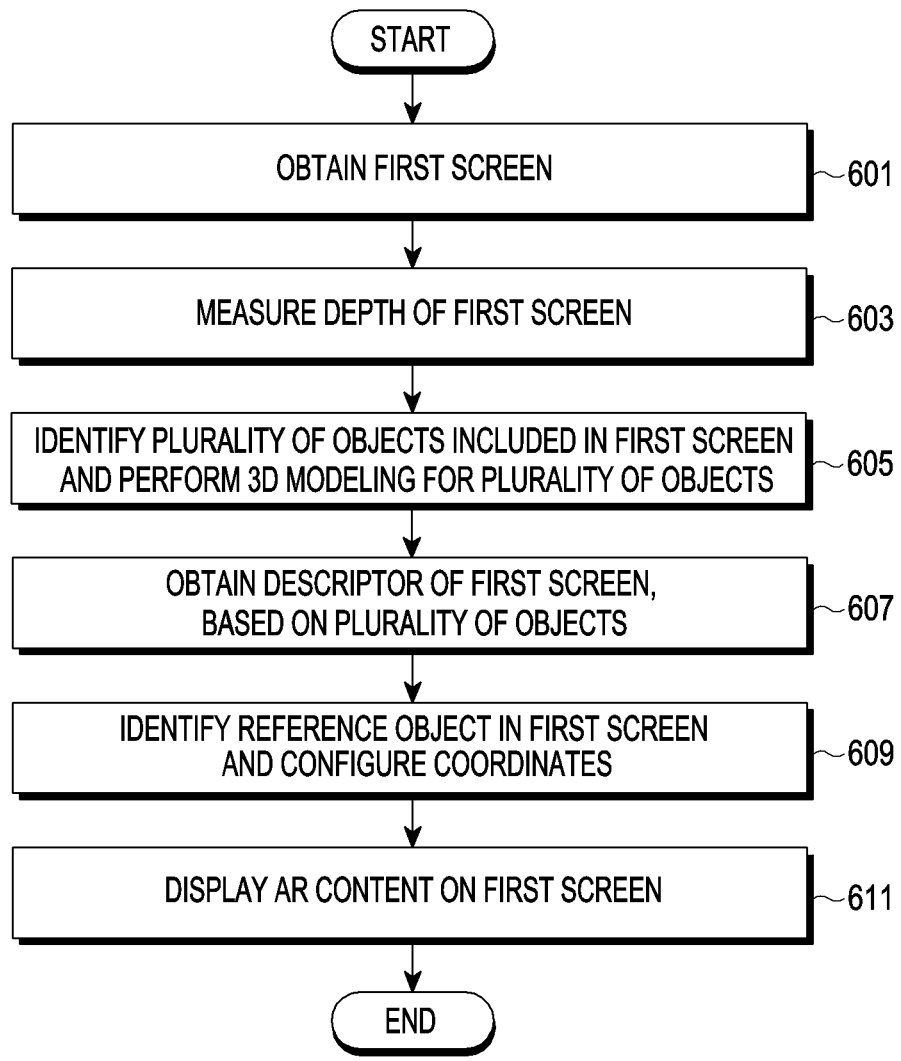
FIG. 6 is a flowchart illustrating an operation of displaying augmented-reality content by a first electronic device according to an embodiment of the disclosure.

FIG. 6 is a flowchart illustrating an operation of displaying augmented-reality content by a first electronic device according to an embodiment of the disclosure.

Referring to FIG. 6, according to various embodiments of the disclosure, in operation 601, a first electronic device (e.g., the first electronic device 201 in FIG. 2) may obtain a first screen through a camera (e.g., the camera 280 in FIG. 2). For example, the first screen may be a screen captured from a first viewpoint. The first screen may include a plurality of objects.

According to various embodiments of the disclosure, in operation 603, the first electronic device 201 may measure depth information of the first screen.

According to various embodiments of the disclosure, in operation 605, the first electronic device 201 may identify the plurality of objects included in the first screen and perform a 3D modeling operation for the plurality of objects.

According to various embodiments of the disclosure, in operation 607, the first electronic device 201 may obtain a first descriptor of the first screen, based on the plurality of objects. For example, the first electronic device 201 may obtain the first descriptor of the first screen as described with reference to FIG. 4 or 5A to 5C.

According to various embodiments of the disclosure, in operation 609, the first electronic device 201 may identify a reference object among the plurality of objects in the first screen, and configure the coordinates of the plurality of objects with respect to the reference object.

According to various embodiments of the disclosure, in operation 611, the first electronic device 201 may display augmented-reality (AR) content on the first screen. For example, the first electronic device 201 may place the AR content to be associated with the plurality of objects included in the first screen in an automatic manner or in response to an input by a user.

Figure 7:
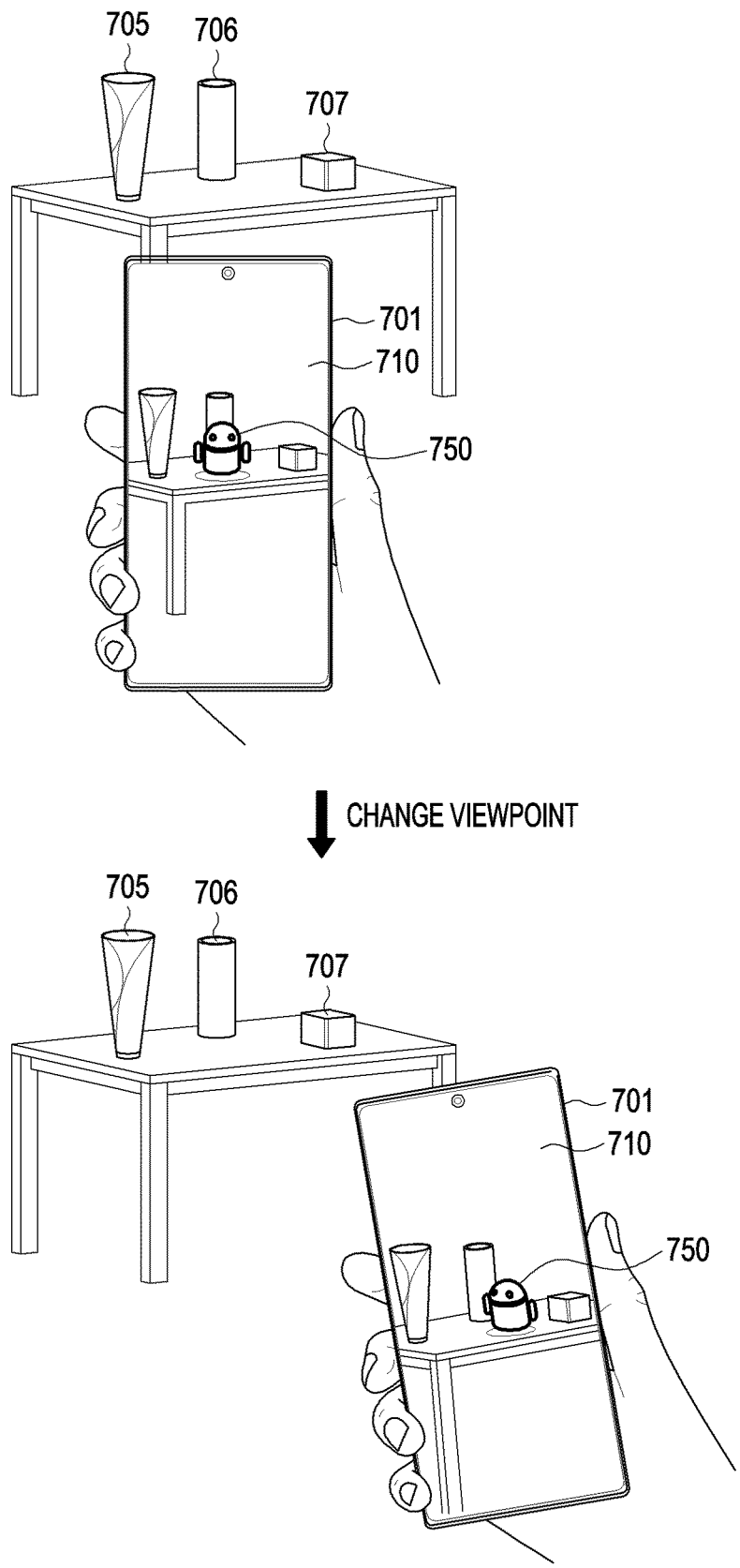
FIG. 7 is a diagram illustrating an operation of, when a viewpoint is changed, displaying augmented-reality content by a first electronic device according to an embodiment of the disclosure.

FIG. 7 is a diagram illustrating an operation of, when a viewpoint is changed, displaying augmented-reality content by a first electronic device according to embodiment of the disclosure.

Referring to FIG. 7, a first electronic device 701 (e.g., the first electronic device 201 in FIG. 2) may obtain a first screen 710 including a plurality of objects 705, 706, and 707 from a first viewpoint. The first electronic device 201 may obtain a first descriptor of the first screen, based on information on the plurality of objects 705, 706, and 707.

According to various embodiments of the disclosure, the first electronic device 701 may display the first screen 710 on a display (e.g., the display 260 in FIG. 2). The first electronic device 701 may display AR content 750 in a first space of the first screen 710 by using the first descriptor.

According to various embodiments of the disclosure, the first viewpoint may change to a second viewpoint according to movement of the first electronic device 701 (or a camera (e.g., the camera 280 in FIG. 2)). The first electronic device 701 may obtain a second screen 720 including the plurality of objects 705, 706, and 707 from the second viewpoint. The first electronic device 701 may display the AR content 750 on the second screen by using the first descriptor, such that the AR content corresponds to the second viewpoint. The AR content 750 may be displayed in a space of the second screen corresponding to the first space of the existing first screen 710.

According to various embodiments of the disclosure, the first electronic device 701 may obtain the second screen 720 including the plurality objects 705, 706, and 707 from the second viewpoint, and obtain a second descriptor corresponding to the second screen 720. The first electronic device 701 may display the AR content 750 on the second screen by using the second descriptor. The AR content 750 may be displayed in the space of the second screen corresponding to the first space of the existing first screen 710.

Figure 8:
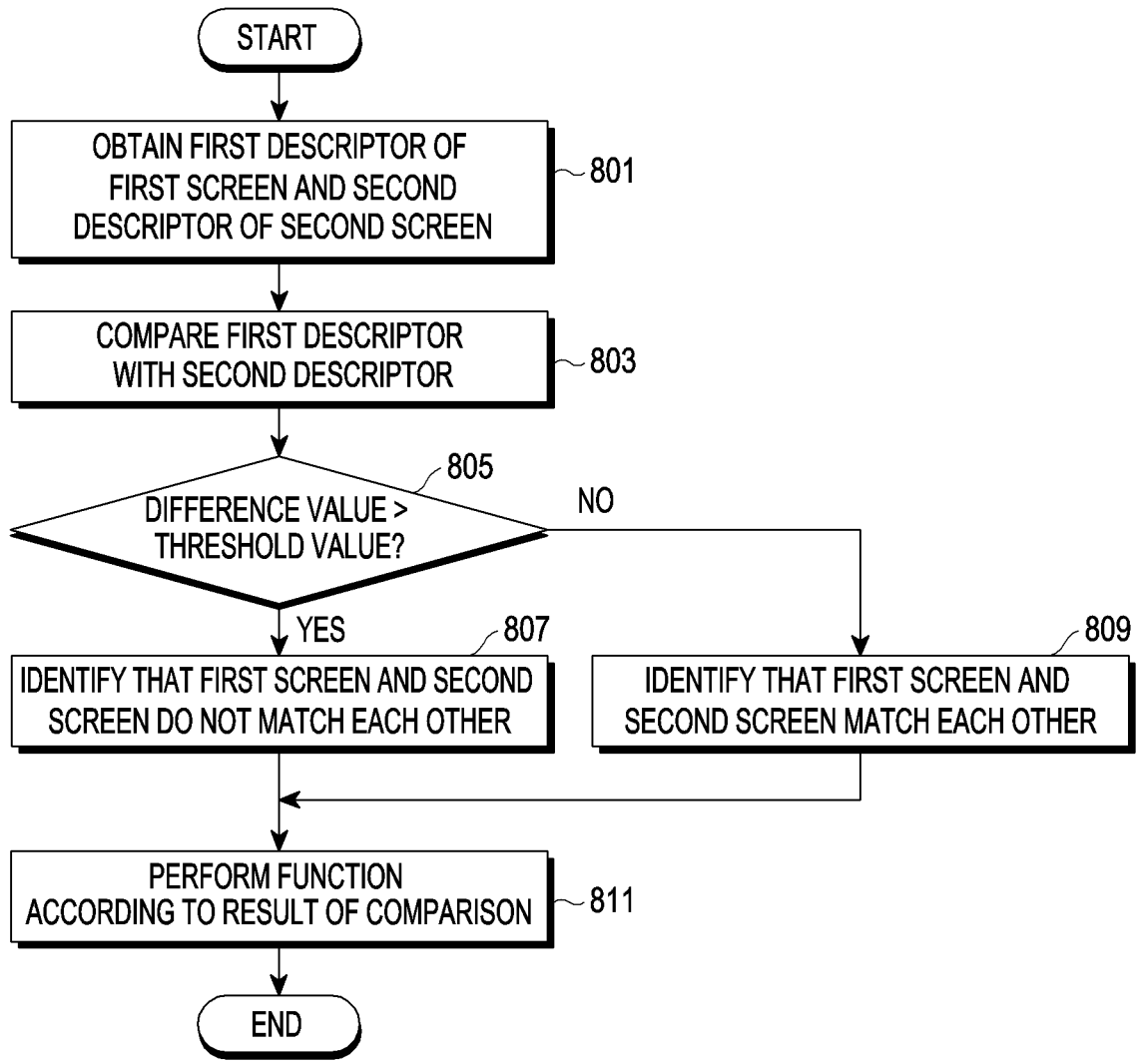
FIG. 8 is a diagram illustrating an operation of determining whether a first screen matches a second screen, by a first electronic device according to an embodiment of the disclosure.

FIG. 8 is a diagram illustrating an operation of determining whether a first screen matches a second screen, by a first electronic device according to an embodiment of the disclosure.

Referring to FIG. 8, according to various embodiments of the disclosure, in operation 801, a first electronic device (e.g., the first electronic device 201 in FIG. 2) may obtain a first descriptor of a first screen and a second descriptor of a second screen. For example, after the first descriptor is obtained, the first electronic device 201 may change a viewpoint and obtain the second descriptor. The first electronic device 201 may also receive the second descriptor from an external electronic device.

According to various embodiments of the disclosure, in operation 803, the first electronic device 201 may compare the first descriptor with the second descriptor. For example, the first electronic device 201 may determine a difference value between the first descriptor and the second descriptor. For example, the difference value may be the same as R shown in Equation 1 below.

According to various embodiments of the disclosure, the first electronic device 201 may determine a difference value for each of common objects included in both the first descriptor and the second descriptor. For example, an R value of the first object may be determined based on sigma ($\sigma$) and a difference value between a descriptor value (e.g., a value related to a size and a relative position) of the first object in the first descriptor, and a descriptor value (e.g., a value related to a size and a relative position of the first object) of the first object in the second descriptor. An R value of the second object may be determined based on sigma ($\sigma$) and a difference value between a descriptor value (e.g., a value related to a size and a relative position) of the second object in the first descriptor and a descriptor value (e.g., a value related to a size and a relative position of the second object) of the second object in the second descriptor. An R value of the third object may be determined based on sigma ($\sigma$) and a difference value between a descriptor value (e.g., a value related to a size and a relative position) of the third object in the first descriptor and a descriptor value (e.g., a value related to a size and a relative position of the third object) of the third object in the second descriptor.

$$R = \|(\text{descriptor1} - \text{descriptor2})/\sigma\|_2 \qquad \text{Equation 1}$$

For example, R may be a value related to a weighted Euclidean distance between descriptors. Sigma ($\sigma$) may be a vector value of a standard deviation of measurement errors of 3D model parameters (e.g., parameters each indicating a size and a relative position) of objects included in a screen.

According to various embodiments of the disclosure, the first electronic device 201 may compare, with a threshold value, the minimum difference value among the difference values between the objects. In operation 805, the first electronic device 201 may determine whether the minimum difference value exceeds the threshold value.

According to various embodiments of the disclosure, if the minimum difference value exceeds the threshold value (Yes in operation 805), the first electronic device 201 may identify that the first screen and the second screen do not match, in operation 807.

According to various embodiments of the disclosure, if the minimum difference value does not exceed the threshold value (No in operation 805), the first electronic device 201 may identify that the first screen and the second screen match each other, in operation 809.

According to various embodiments of the disclosure, in operation 811, the first electronic device 201 may perform a designated function according to a result of the comparison. For example, If the first screen and the second screen do not match each other, the processor 220 may display AR content on the first screen without considering the second descriptor. If the first screen and the second screen do not match each other, the processor 201 may also display augmented-reality content on the first screen or the second screen, based on the difference value between the first descriptor and the second descriptor. If the first screen and the second screen match each other, the processor 220 may display augmented-reality content on the first screen or the second screen by considering both the first descriptor and the second descriptor.

Figure 9:
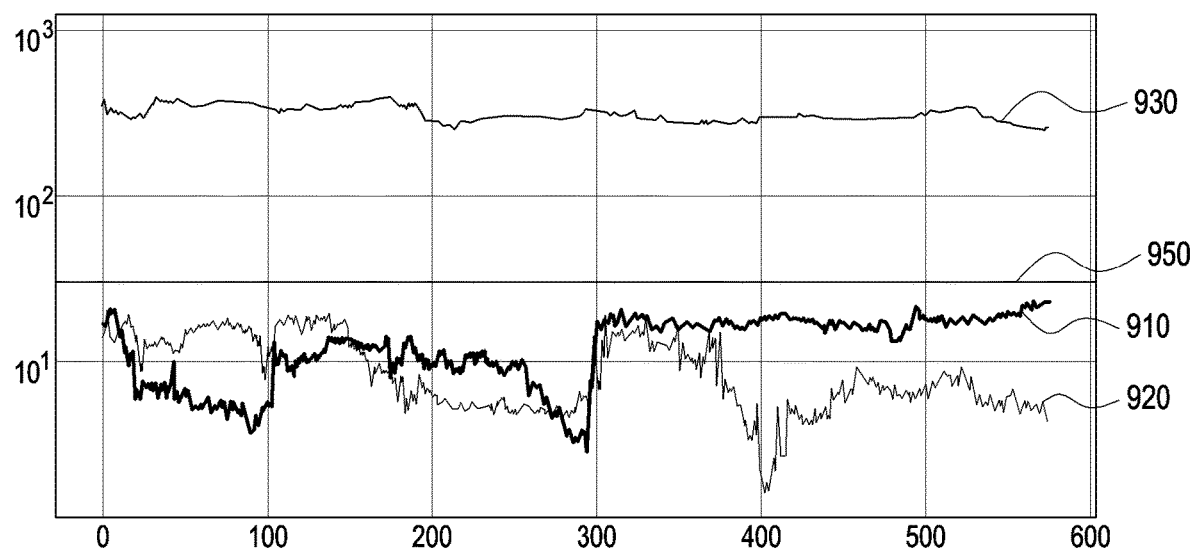
FIG. 9 is a group of graph lines illustrating an operation of determining whether a first screen matches a second screen, by a first electronic device according to an embodiment of the disclosure.

FIG. 9 is a group of graph lines illustrating an operation of determining whether a first screen matches a second screen, by a first electronic device according to an embodiment of the disclosure.

Figure 10:
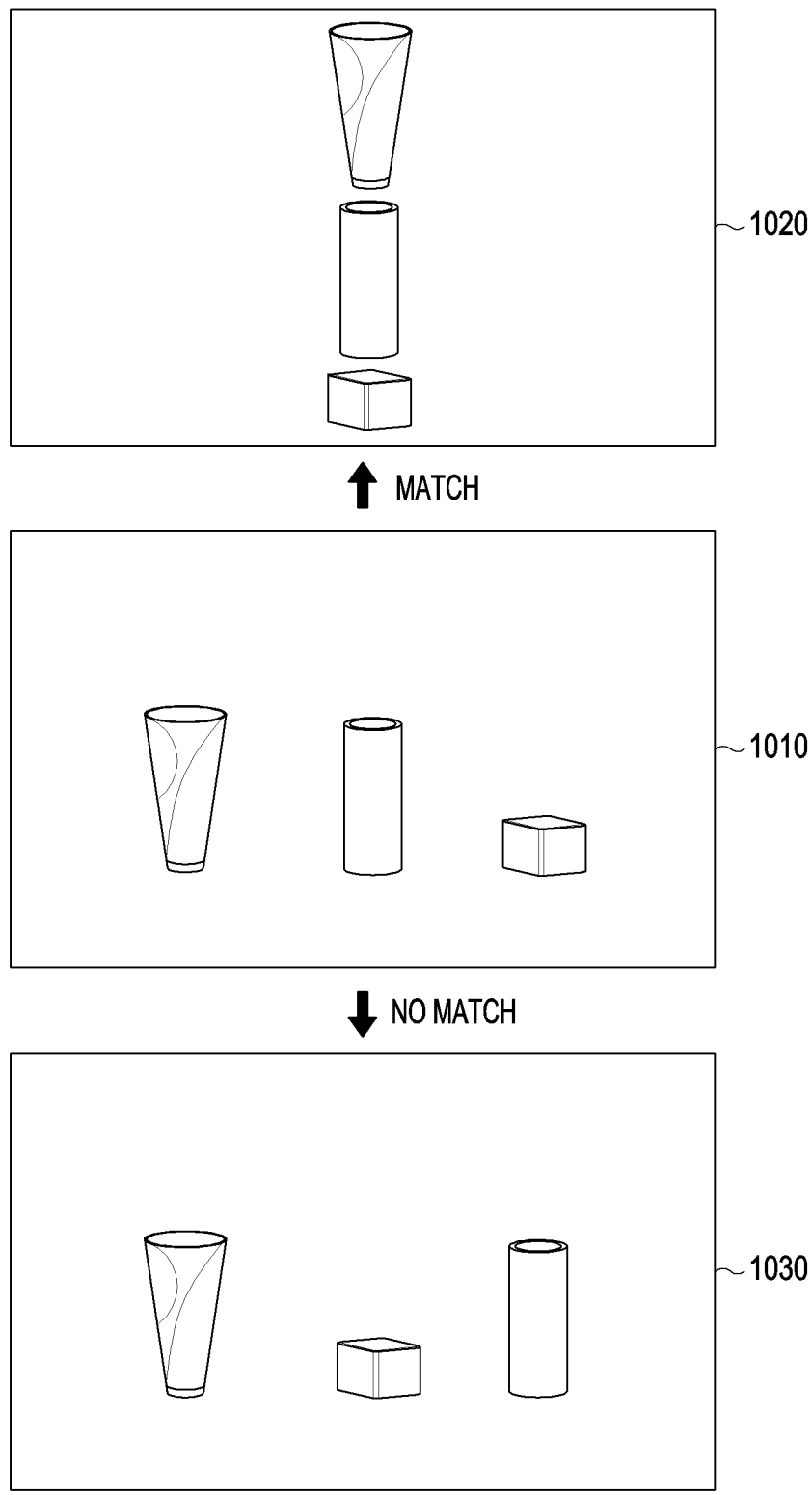
FIG. 10 is a diagram illustrating an operation of determining whether a first screen matches a second screen, according to an embodiment of the disclosure.

FIG. 10 is a diagram illustrating an operation of determining whether a first screen matches a second screen, according to an embodiment of the disclosure.

Referring to FIGS. 9 and 10, the first graph line 910 may indicate object composition scores of the first screen 1010. The second graph line 920 may indicate object composition scores of the second screen 1020. The third graph line 930 may indicate object composition scores of the third screen 1030. The threshold value graph line 950 may be a graph line for determining whether a particular screen matches the first screen. For example, the threshold value graph line 950 may be determined by the first graph line.

According to various embodiments of the disclosure, the first screen 1010 and the second screen 1020 may be screens obtained for the same scene from different viewpoints. Meanwhile, in comparison with the first screen 1010, the third screen 1030 shows a different object arrangement. Therefore, the scene of the third screen may be obtained for a scene different from that of the first screen 1010.

According to various embodiments of the disclosure, a first electronic device (e.g., the first electronic device 201 in FIG. 2) may compare each of the second graph line 920 and the third graph line 930 with the threshold value graph line 950. For example, the first electronic device 201 may determine that the second graph line 920 does not exceed the threshold value graph line 950, and thus the second screen 1020 matches the first screen 1010 (e.g., a screen showing the same scene). The first electronic device 201 may determine that the third graph line 930 exceeds the threshold value graph line 950, and thus the third screen 1030 does not match the first screen 1010 (e.g., the third screen is a screen showing a different scene).

According to the above method, the first electronic device 201 may determine whether screens corresponding to multiple descriptors match each other, by using the multiple descriptors.

Figure 11:
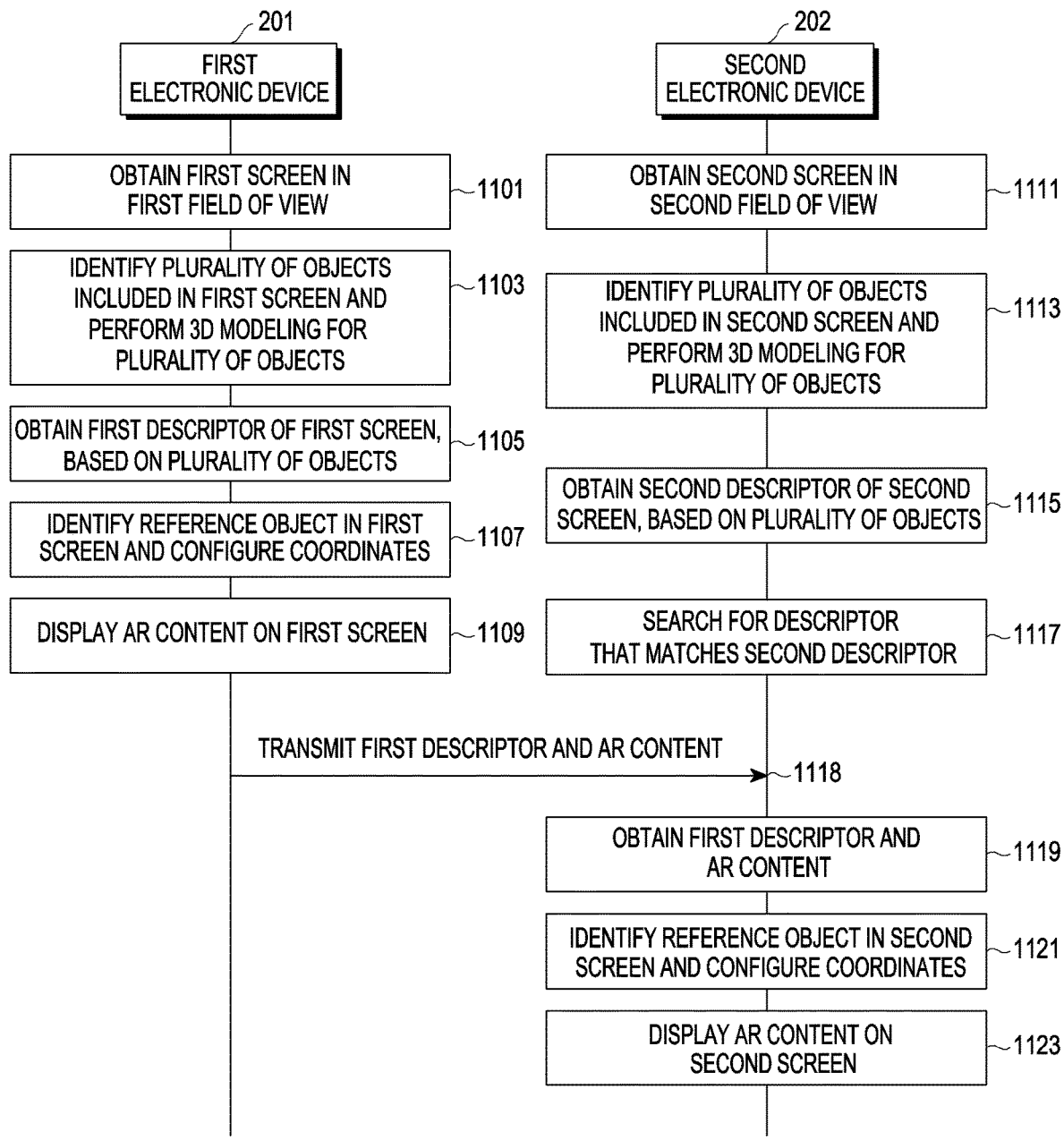
FIG. 11 is a diagram illustrating an operation of a first electronic device and a second electronic device according to an embodiment of the disclosure.

FIG. 11 is a diagram illustrating an operation of a first electronic device and a second electronic device according to an embodiment of the disclosure.

Referring to FIG. 11, according to various embodiments of the disclosure, in operation 1101, a first electronic device (e.g., the first electronic device 201 in FIG. 2) may obtain a first screen in a first field of view (or from a first viewpoint) through a camera (e.g., the camera 280 in FIG. 2).

According to various embodiments of the disclosure, in operation 1103, the first electronic device 201 may identify the plurality of objects included in the first screen and perform a 3D modeling operation for the plurality of objects.

According to various embodiments of the disclosure, in operation 1105, the first electronic device 201 may obtain a first descriptor of the first screen, based on the plurality of objects.

According to various embodiments of the disclosure, in operation 1107, the first electronic device 201 may identify a reference object among the plurality of objects in the first screen and configure coordinates of the plurality of objects included in the first screen, based on the reference object.

According to various embodiments of the disclosure, in operation 1109, the first electronic device 201 may display AR content on the first screen by using the first descriptor.

According to various embodiments of the disclosure, in operation 1111, a second electronic device (e.g., the second electronic device 202 in FIG. 2) may obtain a second screen in a second field of view (or from a second viewpoint) through a camera included in the second electronic device 202.

According to various embodiments of the disclosure, in operation 1113, the second electronic device 202 may identify a plurality of objects included in the second screen, and perform a 3D modeling operation for the plurality of objects.

According to various embodiments of the disclosure, in operation 1115, the second electronic device 202 may obtain a second descriptor of the second screen, based on the plurality of objects.

According to various embodiments of the disclosure, in operation 1117, the second electronic device 202 may search for at least one descriptor that matches the second descriptor. For example, the second electronic device 202 may transmit (broadcast) a signal for requesting a descriptor to at least one electronic device in the vicinity of the second electronic device. Alternatively, the second electronic device 202 may transmit a signal for requesting the first descriptor corresponding to the first screen matching the second screen, to the first electronic device 201.

According to various embodiments of the disclosure, in operation 1118, if a signal for requesting the descriptor is received, the first electronic device 201 may transmit information on the first descriptor and the AR content to the second electronic device 202.

According to various embodiments of the disclosure, in operation 1119, the second electronic device 202 may obtain the information on the first descriptor and the AR content from the first electronic device 201.

According to various embodiments of the disclosure, in operation 1121, the second electronic device 202 may identify a reference object among the plurality of objects in the second screen and configure coordinates of the plurality of objects included in the second screen, based on the reference object.

According to various embodiments of the disclosure, in operation 1123, the second electronic device 202 may display AR content on the second screen, based on the first descriptor and the second descriptor. For example, the AR content may be the AR content obtained from the first electronic device 201.

According to the method described above, the first electronic device 201 and the second electronic device 202 may display AR content at a common position (or space) with respect to the same scene. In addition, the first electronic device 201 and the second electronic device 202 may display AR content, the left/right or upward/downward orientation of which is switched according to an angle corresponding to each field of view (or viewpoint).

Figure 12:
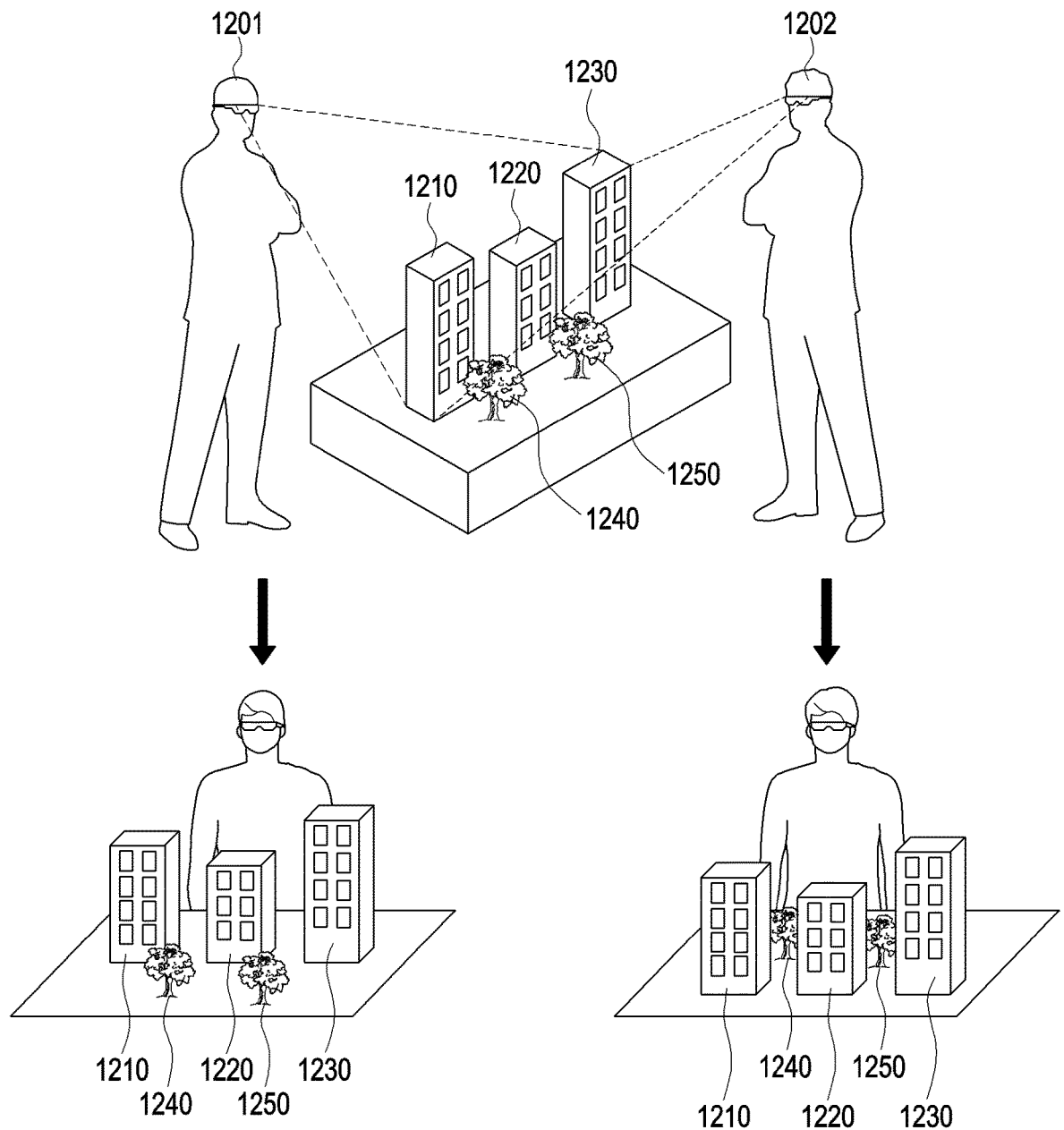
FIG. 12 is a diagram illustrating an operation of a first electronic device and a second electronic device according to an embodiment of the disclosure.

FIG. 12 is a diagram illustrating an operation of a first electronic device and a second electronic device according to an embodiment of the disclosure.

Referring to FIG. 12, a first electronic device 1201 (e.g., the first electronic device 201 in FIG. 1) may obtain a first descriptor of a first screen, based on a plurality of objects 1210, 1220, and 1230. In addition, a second electronic device 1202 (e.g., the second electronic device 202 in FIG. 2) may obtain a second descriptor of a second screen, based on the plurality of objects 1210, 1220, and 1230. For example, the first screen and the second screen may be screens showing an identical scene, differing only in that the viewpoints of the screens are different from each other.

According to various embodiments of the disclosure, the first electronic device 1201 may display AR content 1240 and 1250 on the first screen. In addition, the second electronic device 1202 may also display the AR content 1240 and 1250 on the second screen. The first electronic device 1201 and the second electronic device 1202 may display the AR content 1240 and 1250 at the same positions (or in the same space) in the same screen according to the viewpoints. For example, the first electronic device 1201 may display the AR content 1240 and 1250 such that the AR content 1240 and 1250 is partially hidden by the plurality of objects 1210, 1220, and 1230. In addition, the second electronic device 1202 may display the AR content 1240 and 1250 such that the AR content 1240 and 1250 is not hidden by the plurality of objects 1210, 1220, and 1230.

According to the method described above, the first electronic device 1201 and the second electronic device 1202 may display the AR content 1240 and 1250 at common positions (or in a common space) with respect to the same scene. In addition, the first electronic device 1201 and the second electronic device 1202 may display the plurality of objects 1210, 1220, and 1230, and the AR content 1240 and 1250 such that the plurality of objects and the AR content are associated with each other according to an angle corresponding to each field of view (or viewpoint). Therefore, a plurality of users using the first electronic device 1201 and the second electronic device 1202 may share the AR content 1240 and 1250.

Figure 13:
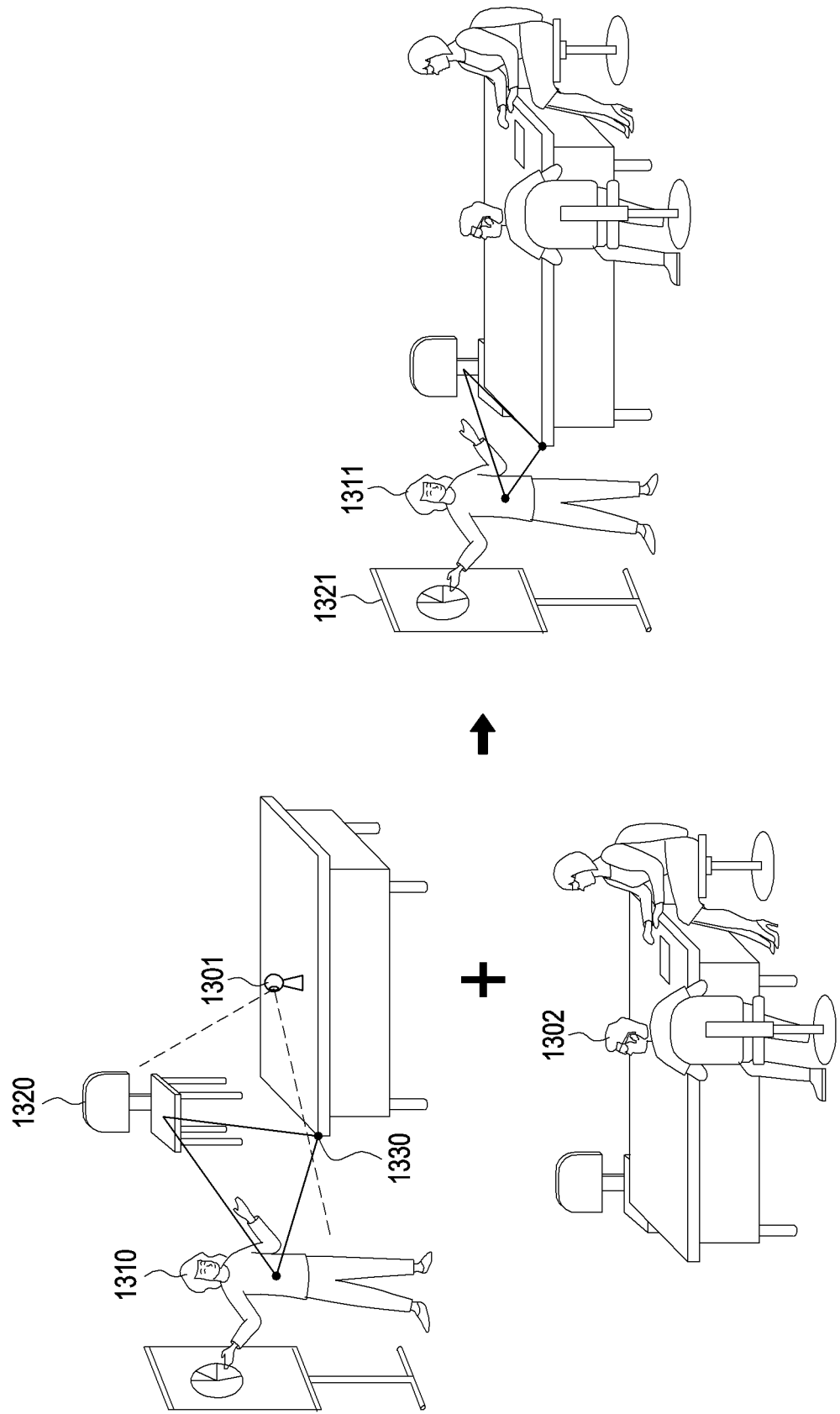
FIG. 13 is a diagram illustrating an operation of a first electronic device and a second electronic device according to an embodiment of the disclosure.

FIG. 13 is a diagram illustrating an operation of a first electronic device and a second electronic device according to an embodiment of the disclosure.

Referring to FIG. 13, a first electronic device 1301 (e.g., the first electronic device 201 in FIG. 1) may obtain a first descriptor of a first screen, based on a plurality of objects 1310, 1320, and 1330. In addition, a second electronic device 1302 (e.g., the second electronic device 202 in FIG. 2) may obtain a second descriptor of a second screen. For example, the first screen and the second screen may be screens showing different scenes. For example, the first screen may not match the second screen.

According to various embodiments of the disclosure, if the first screen and the second screen do not match, the second electronic device 1302 may display, as AR content 1311 and 1321 on the second screen, at least some objects (e.g., the object 1310) among the plurality of objects 1310, 1320, and 1330 included in the first screen, based on the difference between the first descriptor and the second descriptor. For example, the second electronic device 1320 may display the AR content 1311 and 1321 at positions in the second screen similar to those in the first screen, based on a difference between the first descriptor and the second descriptor.

According to the method described above, even if the first electronic device 1301 and the second electronic device 1302 are located at respective positions (or spaces) in different places, the first electronic device and the second electronic device may display the AR content 1311 and 1321 to share similar scenes. Therefore, a plurality of users using the first electronic device 1301 and the second electronic device 1302 may perform telepresence at different places by displaying the AR content 1311 and 1321.

Figure 14:
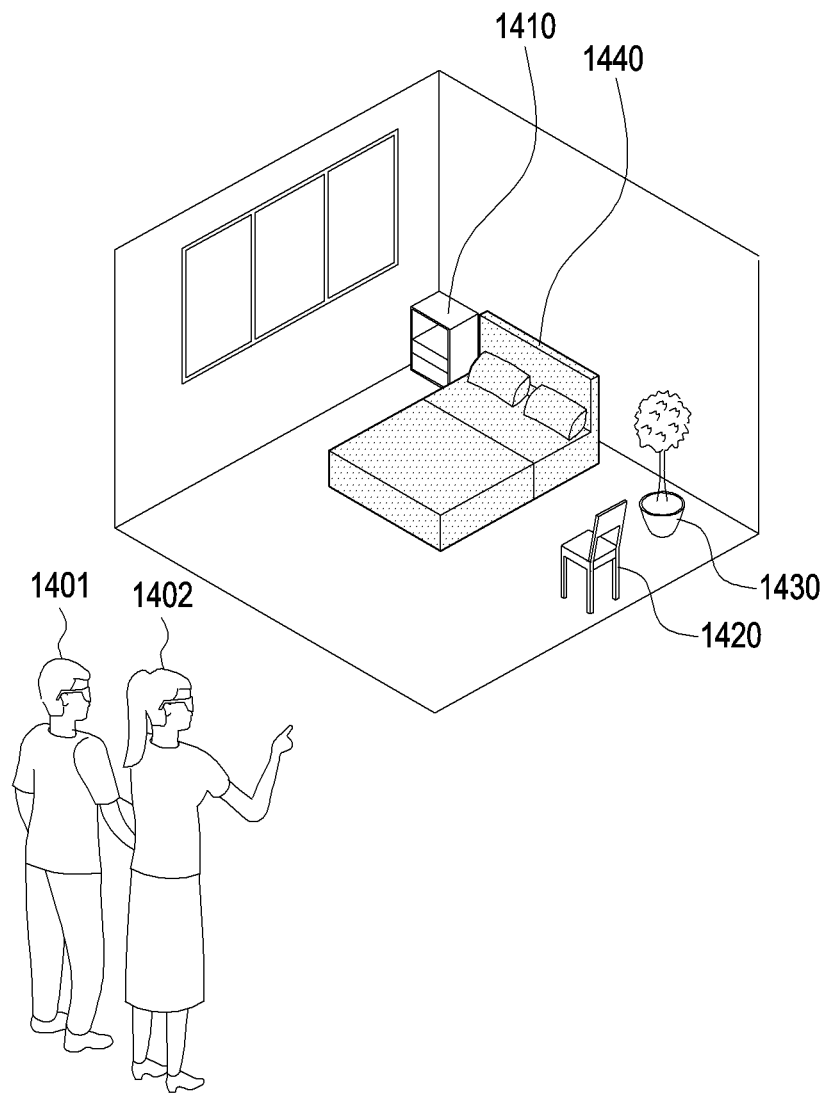
FIG. 14 is a diagram illustrating an operation of a first electronic device and a second electronic device according to an embodiment of the disclosure.

FIG. 14 is a diagram illustrating an operation of a first electronic device and a second electronic device according to an embodiment of the disclosure.

Referring to FIG. 14, a first electronic device 1401 (e.g., the first electronic device 201 in FIG. 1) may obtain a first descriptor of a first screen, based on a plurality of objects 1410, 1420, and 1430. In addition, a second electronic device 1402 (e.g., the second electronic device 202 in FIG. 2) may obtain a second descriptor of a second screen, based on the plurality of objects 1410, 1420, and 1430. For example, the first screen and the second screen may be screens showing an identical scene, differing only in that the viewpoints of the screens are different from each other.

According to various embodiments of the disclosure, the first electronic device 1401 may display AR content 1440 on the first screen. In addition, the second electronic device 1402 may also display the AR content 1440 on the second screen. The first electronic device 1401 and the second electronic device 1402 may display the AR content 1440 at the same position (or space) in the same screen according to the viewpoints.

According to various embodiments of the disclosure, the first electronic device 1401 and the second electronic device 1402 may share the display of the AR content 1440 in real time. For example, the first electronic device 1401 may change the position of the AR content 1440 in the first screen according to a user input. The second electronic device 1402 may display the AR content 1440 corresponding to the AR content 1440, the position of which has been changed, on the second screen.

According to the method described above, the first electronic device 1401 and the second electronic device 1402 may display the AR content 1440 at a common position (or space) with respect to the same scene. Therefore, a plurality of users using the first electronic device 1401 and the second electronic device 1402 may determine whether an object represented by the AR content 1440 is suited to the surroundings thereof, by changing the position or type of the AR content 1440 (e.g., furniture).

Figure 15:
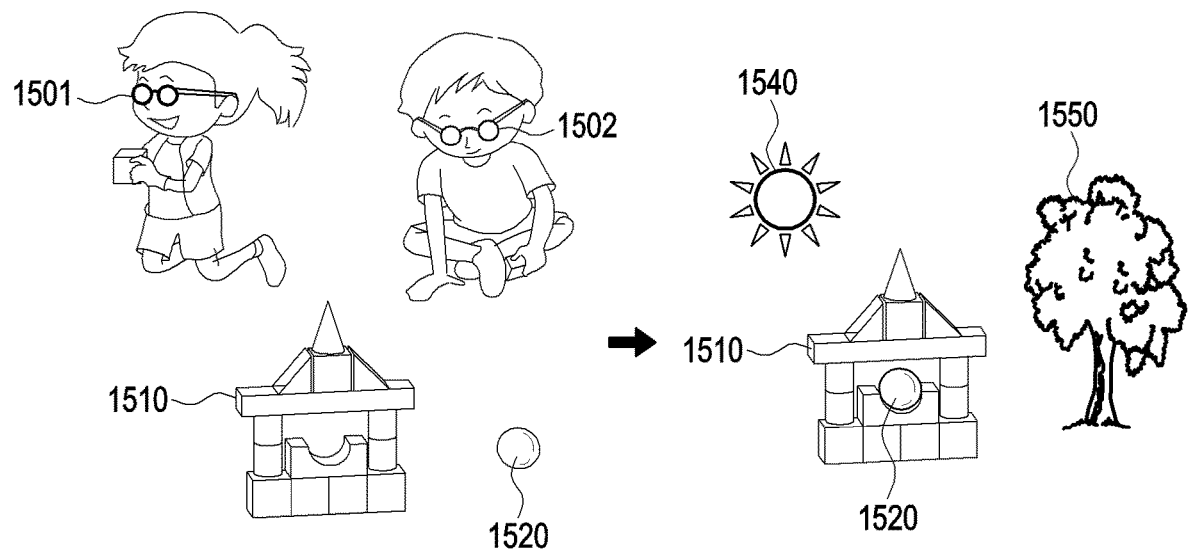
FIG. 15 is a diagram illustrating an operation of a first electronic device according to an embodiment of the disclosure.

FIG. 15 is a diagram illustrating an operation of a first electronic device according to an embodiment of the disclosure.

Referring to FIG. 15, a first electronic device 1501 (e.g., the first electronic device 201 in FIG. 1) may obtain a first descriptor of a first screen, based on a plurality of objects 1510 and 1520. In addition, a second electronic device 1502 (e.g., the second electronic device 202 in FIG. 2) may obtain a second descriptor of a second screen, based on the plurality of objects 1510, and 1520. For example, the first screen and the second screen may be screens showing an identical scene, differing only in that the viewpoints of the screens are different from each other.

According to various embodiments of the disclosure, if the plurality of objects 1510 and 1520 are placed to form a designated shape together with one another, the first electronic device 1501 and the second electronic device 1502 may display AR content 1540 and 1550. For example, if the first object 1510 and the second object 1520 are distant from each other, the first electronic device 1501 and the second electronic device 1502 may not display the AR content 1540 and 1550. On the other hand, if the first object 1510 and the second object 1520 are placed to form a designated shape together with one another, the first electronic device 1501 and the second electronic device 1502 may display the AR content 1540 and 1550 on the first screen and the second screen, respectively.

Figure 16A:
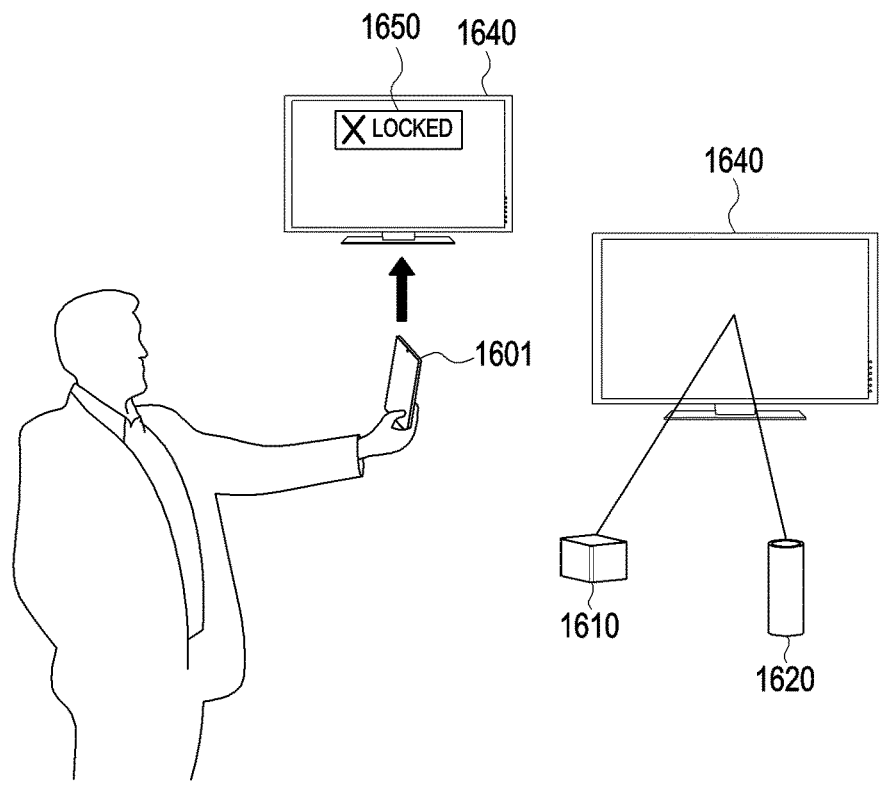
FIGS. 16A and 16B are diagrams illustrating an operation of a first electronic device according to various embodiments of the disclosure.
Figure 16B:
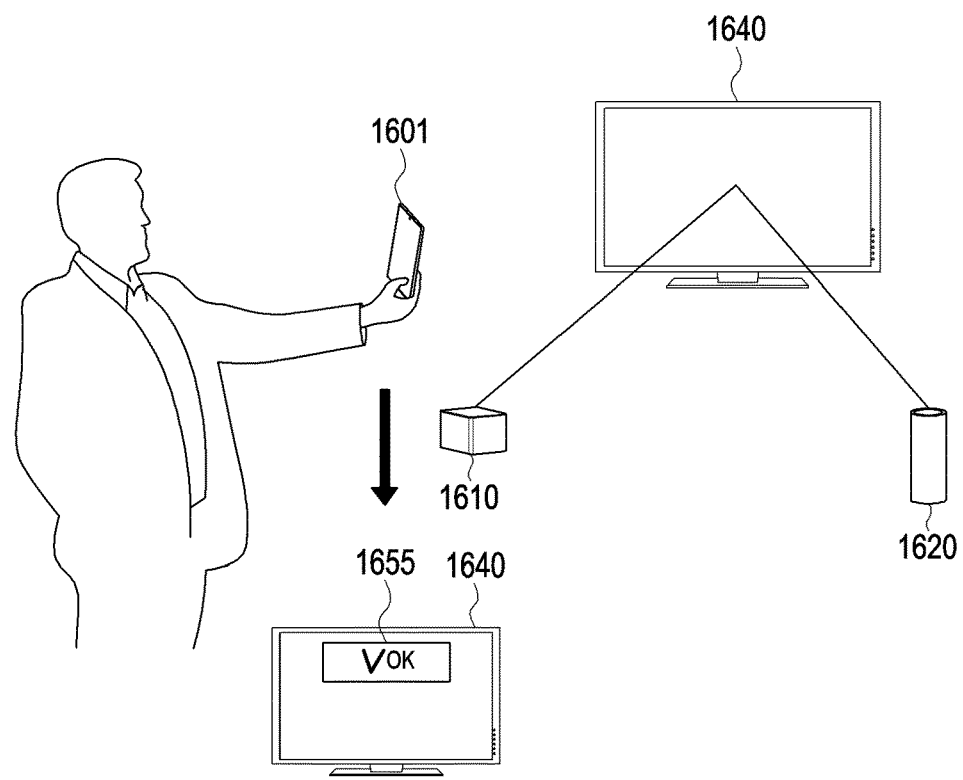

FIGS. 16A and 16B are diagrams illustrating an operation of a first electronic device according to various embodiments of the disclosure.

Referring to FIGS. 16A and 16B, a first electronic device 1601 (e.g., the first electronic device 201 in FIG. 1) may obtain a first descriptor of a first screen. For example, the first electronic device 1601 may determine whether a change is detected, or perform an unlocking function by using the first descriptor.

According to various embodiments of the disclosure, after the first descriptor is obtained, the first electronic device 1601 may determine whether the positions of a first object 1610, a second object 1620, and a third object 1640 have changed, by using the first descriptor. For example, the first electronic device 1601 may determine, using the first descriptor, whether the positions of the first object 1610, the second object 1620, and the third object 1640 when the first descriptor is obtained are different from the current positions of the first object 1610, the second object 1620, and the third object 1640.

Referring to FIG. 16A, if the positions of the first object 1610, the second object 1620, and the third object 1640 are changed, the first electronic device 1601 may maintain a lock on a computing device (e.g., the third object 1640). The first electronic device 1601 may display AR content 1650 indicating that the lock is held, on the third object 1640 displayed through a display (e.g., the display 260 in FIG. 2).

Referring to FIG. 16B, if the positions of the first object 1610, the second object 1620, and the third object 1640 are not changed, the first electronic device 1601 may release a lock on a computing device (e.g., the third object 1640). The first electronic device 1601 may display AR content 1655 indicating that the lock is released, on the third object 1640 displayed through a display (e.g., the display 260 in FIG. 2).

Figure 17:
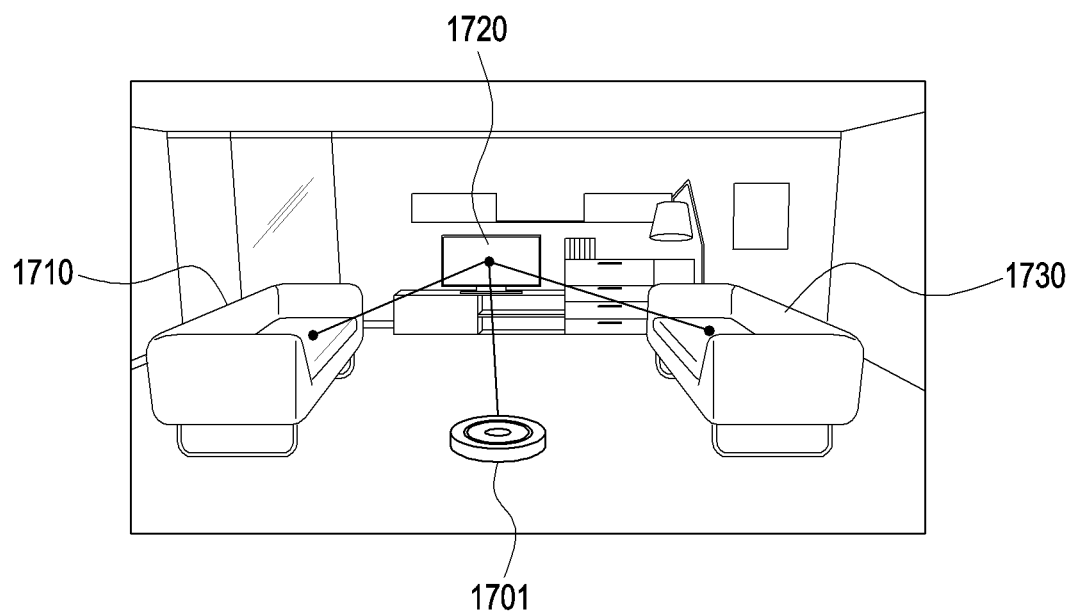
FIG. 17 is a diagram illustrating an operation of a first electronic device according to an embodiment of the disclosure.

FIG. 17 is a diagram illustrating an operation of a first electronic device according to an embodiment of the disclosure.

Referring to FIG. 17, a first electronic device 1701 (e.g., the first electronic device 201 in FIG. 2) may be implemented as a movable robot. For example, the first electronic device 1701 may be implemented as a robot vacuum cleaner.

According to various embodiments of the disclosure, the first electronic device 1701 may determine an optimal movement path for cleaning a particular space before performing cleaning. If the first electronic device 1701 does not have map information of the particular space, the first electronic device is unable to determine the optimal movement path.

According to various embodiments of the disclosure, the first electronic device 1701 may obtain a first screen including a plurality of objects (e.g., the objects 1710, 1720, and 1730) included in the particular space, and obtain a first descriptor of the first screen. For example, the first electronic device 1701 may determine an optimal movement path by using the first descriptor.

An electronic device according to various embodiments may include a camera and a processor, wherein the processor is configured to obtain a first screen including a plurality of objects through the camera, identify s size of each of the plurality of objects, based on a geometric shape of each of the plurality of objects, identify a relative position of each of the plurality of objects, based on distances between the plurality of objects, obtain a first descriptor of the first screen, based on the size and the relative position of each of the plurality of objects, and display augmented-reality content in a space of the first screen, using the first descriptor.

The processor may be configured to identify the geometric shape of each of the plurality of objects, based on designated geometric shapes.

The first descriptor may include information on a type of each of the plurality of objects, the size of each of the plurality of objects, and the relative position of each of the plurality of objects.

The processor may be configured to obtain the first descriptor further based on at least one of orientation, visual characteristic, or contact surface of each of the plurality of objects.

The processor may be configured to transmit information on the first descriptor and the augmented-reality content to an external electronic device.

The processor may be configured to obtain a second descriptor of a second screen, and compare the first descriptor with the second descriptor and identify whether the first screen and the second screen match each other, based on a result of the comparison.

The processor may be configured to: compare a threshold value with a difference value between the first descriptor and the second descriptor, if the difference value is not greater than the threshold value, determine that the first screen and the second screen are screens having different viewpoints with respect to a plurality of objects in an identical state, and if the difference value is greater than the threshold value, determine that the first screen and the second screen are screens showing a plurality of object in different states.

The processor may be configured to search for at least one descriptor matching the first descriptor, and obtain the second descriptor from an external electronic device according to a result of the search.

The processor may be configured to perform a designated function based on whether the first screen and the second screen match each other.

The processor may be configured to, if a viewpoint of the first screen is changed, display the augmented-reality content by using the first descriptor so that the augmented-reality content corresponds to the changed viewpoint.

A method for operating an electronic device according to various embodiments may include: obtaining a first screen including a plurality of objects through a camera included in the electronic device, identifying a size of each of the plurality of objects, based on a geometric shape of each of the plurality of objects, identifying a relative position of each of the plurality of objects, based on distances between the plurality of objects, obtaining a first descriptor of the first screen, based on the size and the relative position of each of the plurality of objects, and displaying augmented-reality content in a space of the first screen, using the first descriptor.

The method may further include identifying the geometric shape of each of the plurality of objects, based on designated geometric shapes.

The first descriptor may include information on a type of each of the plurality of objects, the size of each of the plurality of objects, and the relative position of each of the plurality of objects.

The obtaining of the first descriptor may include obtaining the first descriptor further based on at least one of orientation, visual characteristic, or contact surface of each of the plurality of objects.

The method of the electronic device may further include transmitting information on the first descriptor and the augmented-reality content to an external electronic device.

The method of the electronic device may further include: obtaining a second descriptor of a second screen, and comparing the first descriptor with the second descriptor and identifying whether the first screen and the second screen match each other, based on a result of the comparison.

The determining of whether the first screen and the second screen match each other may include comparing a predesignated threshold value with a difference value between the first descriptor and the second descriptor, if the difference value is not greater than the threshold value, determining that the first screen and the second screen are screens having different viewpoints with respect to a plurality of objects in an identical state, and if the difference value is greater than the threshold value, determining that the first screen and the second screen are screens showing a plurality of object in different states.

The obtaining of the second descriptor may include searching for at least one descriptor matching the first descriptor, and obtaining the second descriptor from an external electronic device according to a result of the search.

The method of the electronic device may further include, if a viewpoint of the first screen is changed, displaying the augmented-reality content by using the first descriptor so that the augmented-reality content corresponds to the changed viewpoint.

At least one non-transitory computer-readable recording medium according to various embodiments may store a program for performing operations of obtaining a first screen including a plurality of objects through a camera included in an electronic device, identifying a size of each of the plurality of objects, based on a geometric shape of each of the plurality of objects, identifying a relative position of each of the plurality of objects, based on distances between the plurality of objects, obtaining a first descriptor of the first screen, based on the size and the relative position of each of the plurality of objects, and displaying augmented-reality content in a space of the first screen, using the first descriptor.

Each of the aforementioned elements of the electronic device may include one or more components, and the names of the components may vary depending on the type of the electronic device. In various embodiments of the disclosure, the electronic device may be configured to include at least one of the above-described elements, and may exclude some of the elements or may include other additional elements. In addition, according to various embodiments of the disclosure, some of the elements of the electronic device may be combined into a single entity that performs the same functions as those of the corresponding elements prior to the combination.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera; and
a processor,
wherein the processor is configured to:
obtain, through the camera, a first screen including a plurality of objects,
based on a geometric shape of each of the plurality of objects, identify a size of each of the plurality of objects,
based on distances between the plurality of objects, identify a relative position of each of the plurality of objects,
based on the size and the relative position of each of the plurality of objects, obtain a first descriptor of the first screen and configure a coordinate system for the first screen using the first descriptor, and
display augmented-reality content in a space of the first screen using the first descriptor, the space of the first screen being determined based on the coordinate system.

2. The electronic device of claim 1, wherein the processor is further configured to:
identify the geometric shape of each of the plurality of objects based on designated geometric shapes.

3. The electronic device of claim 1, wherein the first descriptor comprises information on a type of each of the plurality of objects, information on the size of each of the plurality of objects, and information on the relative position of each of the plurality of objects.

4. The electronic device of claim 1, wherein the processor is further configured to:
obtain the first descriptor further based on at least one of an orientation, a visual characteristic, or a contact surface of each of the plurality of objects.

5. The electronic device of claim 1, wherein the processor is further configured to:
transmit information on the first descriptor and the augmented-reality content to an external electronic device.

6. The electronic device of claim 1, wherein the processor is further configured to:
obtain a second descriptor of a second screen,
compare the first descriptor with the second descriptor, and
based on a result of comparing the first descriptor with the second descriptor, identify whether the first screen and the second screen match each other.

7. The electronic device of claim 6, wherein the processor is further configured to:
compare a threshold value with a difference value between the first descriptor and the second descriptor,
based on the difference value not being greater than the threshold value, determine that the first screen and the second screen are screens having different viewpoints with respect to objects in an identical state, and
based on the difference value being greater than the threshold value, determine that the first screen and the second screen are screens showing objects in different states.

8. The electronic device of claim 6, wherein the processor is further configured to:
search for at least one descriptor matching the first descriptor, and
obtain the second descriptor from an external electronic device according to a result of the search.

9. The electronic device of claim 1, wherein the processor is further configured to:
perform a designated function based on whether the first screen and a second screen match each other.

10. The electronic device of claim 1, wherein the processor is further configured to:
based on a viewpoint of the first screen being changed, display the augmented-reality content by using the first descriptor so that the augmented-reality content corresponds to the changed viewpoint.

11. The electronic device of claim 1, wherein the processor is further configured to:
as at least part of the configuring of the coordinate system of the first screen, configure a coordinate value corresponding to respective positions of the plurality of objects by using the first descriptor.

12. A method for operating of an electronic device, the method comprising:
obtaining a first screen including a plurality of objects through a camera included in the electronic device;
based on a geometric shape of each of the plurality of objects, identifying a size of each of the plurality of objects;
based on distances between the plurality of objects, identifying a relative position of each of the plurality of objects;
based on a size and the relative position of each of the plurality of objects, obtaining a first descriptor of the first screen and configure a coordinate system for the first screen using the first descriptor; and
displaying augmented-reality content in a space of the first screen using the first descriptor, the space of the first screen being determined based on the coordinate system.

13. The method of claim 12, further comprising:
identifying the geometric shape of each of the plurality of objects, based on designated geometric shapes.

14. The method of claim 12, wherein the first descriptor comprises information on a type of each of the plurality of objects, information on the size of each of the plurality of objects, and information on the relative position of each of the plurality of objects.

15. The method of claim 12, wherein the obtaining of the first descriptor comprises obtaining the first descriptor further based on at least one of an orientation, a visual characteristic, or a contact surface of each of the plurality of objects.

16. The method of claim 12, further comprising:
transmitting information on the first descriptor and the augmented-reality content to an external electronic device.

17. The method of claim 12, further comprising:
obtaining a second descriptor of a second screen;
comparing the first descriptor with the second descriptor; and
based on a result of comparing the first descriptor with the second descriptor, identifying whether the first screen and the second screen match each other.

18. The method of claim 17, wherein the identifying of whether the first screen and the second screen match each other comprises:
comparing a predesignated threshold value with a difference value between the first descriptor and the second descriptor;

based on the difference value not being greater than the threshold value, determining that the first screen and the second screen are screens having different viewpoints with respect to objects in an identical state; and based on the difference value being greater than the threshold value, determining that the first screen and the second screen are screens showing objects in different states.

19. The method of claim 17, wherein the obtaining of the second descriptor comprises:

searching for at least one descriptor matching the first descriptor; and obtaining the second descriptor from an external electronic device according to a result of the search.

20. The method of claim 12, further comprising:

based on a viewpoint of the first screen being changed, displaying the augmented-reality content by using the first descriptor so that the augmented-reality content corresponds to the changed viewpoint.

21. The method of claim 12, further comprising:

performing a designated function based on whether the first screen and a second screen match each other.

22. At least one non-transitory computer-readable recording medium storing a program which, when executed by at least one processor, causes the at least one processor to perform operations of:

obtaining, through a camera of an electronic device, a first screen including a plurality of objects;

based on a geometric shape of each of the plurality of objects, identifying a size of each of the plurality of objects;

based on distances between the plurality of objects, identifying a relative position of each of the plurality of objects;

based on the size and the relative position of each of the plurality of objects, obtaining a first descriptor of the first screen and configure a coordinate system for the first screen using the first descriptor; and displaying augmented-reality content in a space of the first screen using the first descriptor, the space of the first screen being determined based on the coordinate system.

* * * * *